US007616685B2

(12) United States Patent
Fimoff et al.

(10) Patent No.: US 7,616,685 B2
(45) Date of Patent: Nov. 10, 2009

(54) METHOD FOR CHANNEL TRACKING IN AN LMS ADAPTIVE EQUALIZER FOR 8VSB

(75) Inventors: Mark Fimoff, Hoffman Estates, IL (US); Jin Kim, Lake Zurich, IL (US); Gregory J. Tomezak, Buffalo Grove, IL (US)

(73) Assignee: Techwell, Inc., San Jose, CA (US)

( * ) Notice: Subject to any disclaimer, the term of this patent is extended or adjusted under 35 U.S.C. 154(b) by 0 days.

(21) Appl. No.: 11/776,233

(22) Filed: Jul. 11, 2007

(65) Prior Publication Data
US 2008/0175309 A1 Jul. 24, 2008

Related U.S. Application Data

(63) Continuation-in-part of application No. 11/687,909, filed on Mar. 19, 2007.

(60) Provisional application No. 60/885,692, filed on Jan. 19, 2007.

(51) Int. Cl.
*H03H 7/30* (2006.01)
(52) U.S. Cl. ...................................... 375/232
(58) Field of Classification Search ................ 375/229, 375/230, 232, 233, 316, 346
See application file for complete search history.

(56) References Cited

U.S. PATENT DOCUMENTS

| 4,027,258 A * | 5/1977 | Perreault ...................... 333/18 |
| 5,530,485 A | 6/1996 | Kim et al. |
| 5,886,748 A | 3/1999 | Lee |
| 5,940,435 A | 8/1999 | Hendrickson |
| 6,144,697 A | 11/2000 | Gelfand et al. |
| 6,515,713 B1 | 2/2003 | Nam |
| 6,526,093 B1 | 2/2003 | Bao et al. |
| 6,577,685 B1 | 6/2003 | Bao et al. |
| 6,621,863 B1 | 9/2003 | Ido |
| 6,647,071 B2 | 11/2003 | Sommer et al. |
| 6,775,335 B2 | 8/2004 | Sommer et al. |
| 6,907,064 B1 * | 6/2005 | Tokunaga et al. ........... 375/232 |
| 6,912,258 B2 | 6/2005 | Birru |
| 7,038,731 B2 | 5/2006 | Tsuie |
| 7,061,977 B2 | 6/2006 | Martin et al. |
| 7,110,449 B2 | 9/2006 | Heo et al. |
| 7,123,653 B2 | 10/2006 | Kim et al. |

(Continued)

OTHER PUBLICATIONS

Advanced Television Systems Committee, ATSC Digital Television Standard (A-53) Revision E, with Amendments No. 1 and 2, dated Dec. 27, 2005, Apr. 18, 2006 and Sep. 13, 2006, 38 pages.

(Continued)

*Primary Examiner*—Kevin M Burd
(74) *Attorney, Agent, or Firm*—Michael Best & Friedrich LLP

(57) ABSTRACT

A method and system for channel tracking in an adaptive equalizer for a digital data receiver. The method includes determining a first set of tap weights and a second set of tap weights of the equalizer, and determining a difference between the first and second sets of tap weights. The method also includes determining an error estimate based on symbols received at the receiver, comparing the error estimate with a divergence threshold, and determining a step size factor based on the difference and the comparison.

24 Claims, 18 Drawing Sheets

U.S. PATENT DOCUMENTS

| | | |
|---|---|---|
| 7,158,568 B2 | 1/2007 | Park et al. |
| 2003/0215029 A1 | 11/2003 | Limberg |
| 2003/0227968 A1* | 12/2003 | Kim et al. .................... 375/233 |
| 2004/0190649 A1 | 9/2004 | Endres et al. |
| 2005/0129143 A1 | 6/2005 | Kang et al. |
| 2005/0175081 A1 | 8/2005 | Zhidkov |
| 2005/0243908 A1 | 11/2005 | Heo et al. |
| 2005/0259767 A1 | 11/2005 | Garmany et al. |
| 2006/0039460 A1 | 2/2006 | Fimoff |
| 2006/0200511 A1 | 9/2006 | Park et al. |
| 2007/0019825 A1* | 1/2007 | Marumoto et al. ......... 381/94.1 |

OTHER PUBLICATIONS

Advanced Television Systems Committee, Recommended Practice: Guide to the Use of the ATSC Digital Television Standard, Doc. A/54A, dated Dec. 4, 2003, 2 pages.

Advanced Television Systems Committee, (Working Draft) Informational Document: DTV Signal Reception and Processing Considerations, Doc. T3-600r2, dated Jul. 21, 2003, 6 pages.

William Jay Hillery, Ph.D., Thesis, Purdue University, 2004, Advanced Equalization of Digital Television Signals Using the Conjugate Gradient Algorithm, Section 2, dated May 2004, 12 pages.

Serdar Ozen, Ph.D., Thesis, Purdue University, 2003, Topics on Channel Estimation and Equalization for Sparse Channels with Applications to Digital TV Systems, dated May 2003, 10 pages.

S. Haykin, Adaptive Filter Theory, Sections 5.4, 8.2, 9.2, Prentice Hall, 1996, 9 pages.

J. G. Proakis, Digital Communications, 3rd ed., McGraw-Hill, 1995, section 8-2-2, 3 pages.

R. H. Kwong, E. E. Johnston, A Variable Step Size LMS Algorithm, IEEE Transactions on Signal Processing, vol. 40, No. 7, Jul. 1992, 10 pages.

Richard W. Harris, Douglas M. Chabries, F. Avery Bishop, A Variable Step (VS) Adaptive Filter Algorithm, IEEE Transactions on Acoustics, Speech, and Signal Processing, vol. ASSP-34, No. 2, Apr. 1986, 8 pages.

B. Farhang-Boroujeny, Adaptive Filters Theory and Applications, Section 6.7 and Chapter 8, Wiley, 1998, 26 pages.

V. John Mathews, Zhenhua Xie, A Stochastic Gradient Adaptive Filter with Gradient Adaptive Step Size, IEEE Transactions on Signal Processing, vol. 41, No. 6, Jun. 1993, 13 pages.

Advanced Television Systems Committee, ATSC Recommended Practice: Receiver Performance Guidelines, Doc. A/74, dated Jul. 18, 2004, 10 pages.

Jae Chon Lee, Chong Dwan Un, A Reduced Structure of the Frequency-Domain Block LMS Adaptive Digital Filter, Proceeding of the IEEE, vol. 72, No. 12, Dec. 1984, 3 pages.

Jae Chon Lee, Chong Kwan Un, Performance Analysis of Frequency-Domain Block LMS Adaptive Digital Filters, IEEE Transactions on Circuits and Systems, vol. 36, No. 2, Feb. 1989, 17 pages.

David Sparano, What Exactly is 8-VSB Anyway?, http://www.broadcast.net/~sbel/8vsb/8vsb.htm, dated Jan. 25, 2007, 12 pages.

* cited by examiner

METHOD FOR CHANNEL TRACKING IN AN LMS ADAPTIVE EQUALIZER FOR 8VSB

RELATED APPLICATIONS

This application is a continuation-in-part of prior-filed copending U.S. patent application Ser. No. 11/687,909, filed on Mar. 19, 2007, which claims the benefit of prior-filed U.S. Provisional Patent Application Ser. No. 60/885,692, filed on Jan. 19, 2007, the entire contents of both of which are incorporated by reference herein.

FIELD

Embodiments of the invention relate generally to digital communication systems and methods, and particularly to digital television receivers.

BACKGROUND

In 1996, the Advanced Television Systems Committee, Inc. ("ATSC") adopted an ATSC digital television ("DTV") terrestrial transmission standard. Several generations of receivers have been developed since adoption of the ATSC DTV standard. Generally, each generation of receivers was developed to improve reception performance over previous generations of receivers. A main impediment to good reception is severe multipath interference. Hence, complicated equalizers were developed for receivers in order to improve receiver performance by mitigating the effects of the multipath interference.

Terrestrial broadcast DTV channel presents quite a difficult multipath environment. Relatively strong duplicates of the transmitted signal may arrive at a receiver via various reflected signal paths as well as via the direct path from transmitter to receiver. In some cases, there is no direct path from transmitter to receiver, and all received signal paths are via reflection. If the path carrying the strongest signal is regarded as the main signal path, reflected signals may arrive at the receiver both prior to or subsequent to the main signal. The arrival time differences among various signal paths, compared to that of the main signal path, can be large. Also, these reflected signals may vary in time, both in terms of amplitude and delay relative to the main signal path.

During a typical transmission, data is transmitted in frames 100 as shown in FIG. 1. Each frame 100 is composed of two fields 104, 108. Each of the fields 104, 108 includes 313 segments. Each of the segments includes 832 symbols. As such, each of the fields 104, 108 includes a total of 260,416 symbols. Each of the segments begins with a four-symbol sequence, referred to as a segment sync, which comprises four symbols [+5, −5, −5, +5]. The first segment in each field is a field sync segment.

FIG. 2 shows an exemplary field sync segment 200 of the field 104 or 108 of FIG. 1. The field sync segment 200 includes a segment sync 204, a pseudo noise sequence 208 that comprises 511 symbols (PN511), a pseudo noise sequence 212 that comprises 63 symbols (PN63), a second PN63 sequence 216, and a third PN63 sequence 220. The third PN63 sequence 220 is followed by a mode sequence 224 that comprises 24 symbols to indicate a transmitting mode of 8-level vestigial sideband ("8VSB"). In alternate fields, the three PN63 sequences 212, 216, 220 are the same. In the remaining fields, the first and third PN63 sequences 212, 220 are the same while the second PN63 sequence 216 is inverted. In either case, the first 728 symbols of the field sync segment 200 are a priori known to a receiver and may be used for equalizer training. The mode sequence 224 is followed by a reserved mode sequence 228 of 92 symbols composing various mode and reserved fields that are not a priori known to the receiver. The sequences 204, 208, 212, 216, 220, 224, and 228 symbols use a symbol set of {+5, −5}. The field sync segment 200 ends with a precode sequence 232 comprising 12 symbols that use a symbol set of {−7, −5, −3, −1, +1, +3, +5, +7}, and are duplicates of the last 12 symbols of the preceding data field. These are thus called precode symbols.

The remaining 312 segments of each field 104, 108 are referred to as data segments. An exemplary data segment 300 is shown in FIG. 3. After the segment sync symbols 204, the data segment 300 includes a data sequence 304 that comprises 828 symbols. The symbols are trellis encoded by a 12 phase trellis encoder that results in 8-level symbols from a symbol set of {−7, −5, −3, −1, +1, +3, +5, +7}.

FIG. 4 shows a digital data (e.g., 8VSB) transmitter 400. The transmitter 400 includes a randomizer 404 that randomizes data to be transmitted, a Reed-Solomon encoder 408 that encodes the randomized data from the randomizer 404, and an interleaver 412 that interleaves Reed-Solomon byte-wise encoded data. The transmitter 400 also includes a trellis encoder 416 that encodes the interleaved data. An exemplary trellis encoder 416 is a 12-phase trellis encoder. A data frame formatter 420 subsequently adds segment sync symbols and field sync symbols to the trellis coded data at appropriate times to create a data frame structure like that of FIG. 1. A pilot insertion module 424 then inserts a pilot carrier frequency signal by adding a fixed DC level to each of the symbols.

A modulator 428 then implements root raised cosine pulse shaping and modulates the signal for RF transmission as an 8VSB signal at a symbol rate of 10.76 MHz. The 8VSB signal differs from other commonly used linear modulation methods such as quadrature amplitude modulation ("QAM") in that the 8VSB symbols are real, but have a pulse shape that is complex with only the real part of the pulse having a Nyquist shape.

FIG. 5 shows a block diagram of a digital data (e.g., 8VSB) receiver 500. The receiver 500 includes a tuner 504 to receive RF signals transmitted from the transmitter 400, and a demodulator 508 to demodulate the RF signal to baseband. The receiver 500 also includes a sync and timing recovery module 512 to perform symbol clock timing and frame synchronization recovery on the demodulated signals. The receiver 500 also includes a matched filter 516 to filter the recovered signals, an equalizer 520 that equalizes the filtered signals, a phase tracker 524 that reduces the phase noise of the equalized signals, a trellis decoder 528 that decodes the noise-reduced equalized signals, a deinterleaver 532 that deinterleaves the decoded signals, a Reed-Solomon decoder 536 that decodes the deinterleaved signals, and a derandomizer 540 that derandomizes the decoded signals.

The multipath RF channel between the transmitter 400 and the receiver 500 can be viewed in its baseband equivalent form. For example, the transmitted signal has a root raised cosine spectrum with a nominal bandwidth of 5.38 MHz and an excess bandwidth of 11.5% centered at one fourth of the symbol rate (i.e., 2.69 MHz). Thus, the transmitted pulse shape or pulse q(t) is complex and given by EQN. (1):

$$q(t) = e^{j\pi F_s t/2} q_{RRC}(t) \quad (1)$$

where $F_s$ is a symbol frequency, and $q_{RRC}(t)$ is a real square root raised cosine pulse with an excess bandwidth of 11.5% of the multipath RF channel. The pulse q(t) is referred to as a "complex root raised cosine pulse." For an 8VSB system, the transmitted pulse shape q(t) and the received and matched filter pulse shape q*(−t) are identical since q(t) is conjugate-symmetric. Thus, the raised cosine pulse p(t), referred to as the "complex raised cosine pulse," is given by EQN. (2):

$$p(t)=q(t)*q*(-t) \quad (2)$$

where * denotes convolution, and * denotes complex conjugation.

The transmitted baseband signal with a data rate of 1/T symbols/sec can be represented by EQN. (3):

$$s(t) = \sum_k I_k q(t - kT), \quad (3)$$

where $\{I_k \in A \equiv \{\alpha_1, \ldots \alpha_8\} \subset R^1\}$ is a transmitted data sequence, which is a discrete 8-ary sequence taking values of the real 8-ary alphabet A. For 8VSB, the alphabet set is {−7, −5, −3, −1, +1, +3, +5, +7}.

A physical channel between the transmitter 400 and the receiver 500 is denoted c(t) and can be described by $$c(t) = \sum_{k=-L_{ha}}^{L_{hc}} c_k \delta(t - \tau_k) \quad (4)$$

where $\{c_k(\tau)\} \subset C^1$, and $L_{ha}$ and $L_{hc}$ are the maximum number of anti-causal and causal multipath delays, respectively. Constant $\tau_k$ is a multipath delay, and variable $\delta(t)$ is a Dirac delta function. Hence, the overall channel impulse response is given by EQN. (5):

$$h(t) = p(t) * c(t) = \sum_{-L_{ha}}^{L_{hc}} c_k p(t - \tau_k) \quad (5)$$

The matched filter output y(t) in the receiver prior to equalization is given by EQN. (6):

$$y(t) = \left(\sum_k \delta(t - kT)\right) * h(t) + v(t), \quad (6)$$

where v(t) is given by EQN. (7):

$$v(t) = \eta(t) * q*(-t) \quad (7)$$

which denotes a complex or colored noise process after the pulse matched filter, with η(t) being a zero-mean white Gaussian noise process with spectral density $\sigma_n^2$ per real and imaginary part. Sampling the matched filter output y(t) at the symbol rate produces a discrete time baseband representation of the input to the equalizer 520, as shown in EQN. (8):

$$y[n] \equiv y(t)|_{t=nT} = \sum_k I_k h[n - k] + v[n]. \quad (8)$$

As stated above, for each data field of 260,416 symbols, only 728 symbols, which reside in the field sync segment 200, are a priori known and thus available for equalizer training.

Furthermore, conditions of the multipath channel are generally not known a priori. As such, the equalizer 520 in the receiver 500 is so configured to adaptively identify and combat various multipath channel conditions.

In the following discussion, n represents a sample time index, regular type represents scalar variables, bold lower case type represents vector variables, bold upper case type represents matrix variables, a * superscript indicates complex conjugation, and the $^H$ superscript indicates conjugate transposition (Hermitian).

The equalizer 520 may be implemented as, or employ equalization techniques relating to, linear equalizers ("LEs"), decision feedback equalizers ("DFEs"), and predictive decision feedback equalizers ("pDFEs"). Equalizer tap weight adaptation is often achieved via a least mean square ("LMS") algorithm or system, which is a low complexity method for adaptively approximating a minimum mean squared error ("MMSE") tap weight solution, or equivalently a solution to the Weiner Hopf equations, described below.

In the case of an LE, let u[n] be an N long equalizer input vector, y[n] be the equalizer output $w^H[n]u[n]$, where $w^H[n]$ is an N long equalizer tap weight vector of a linear transversal filter or an adaptive filter, $R_{uu}[n]=E(u[n]u^H[n])$ has a size of N×N, and $r_{du}=E(u[n]d*[n])$ Then e[n]=d[n]−y[n] where d[n] is the desired symbol.

The mean squared error ("MSE") is given by J=E(e[n]e*[n]). It can be shown that the MSE as a function of filter taps w, J(w), is given by (n index omitted for clarity) EQN. (9):

$$J(w) = \sigma_d^2 - w^H r_{du} - r_{du}^H w + w^H R_{uu} w \quad (9)$$

A gradient vector of J(w) is given by EQN. (10):

$$\nabla J(w) = 2\frac{\partial J(w)}{\partial w^*} = \begin{bmatrix} \frac{\partial J}{\partial w_0^R} + j\frac{\partial J}{\partial w_0^I} \\ \frac{\partial J}{\partial w_1^R} + j\frac{\partial J}{\partial w_1^I} \\ - \\ - \\ \frac{\partial J}{\partial w_{N-1}^R} + j\frac{\partial J}{\partial w_{N-1}^I} \end{bmatrix} = 2(R_{uu}w - r_{du}) \quad (10)$$

An optimal MMSE tap vector $w_{opt}$ is found by setting $\nabla J(w)=0$, yielding the Weiner Hopf tap weight solution given by EQN. (11):

$$w_{opt}[n] = R_{uu}^{-1}[n] r_{du}[n] \quad (11)$$

The MSE is generally a measure of the closeness of w to $w_{opt}$. As a function of the weight vector w, the MSE is then given by EQN. (12):

$$J(w) = J_{min} + (w - w_{opt})^H R_{uu}(w - w_{opt}) \quad (12)$$

where $$J_{min} = \min_w J(w) = \sigma_d^2 - r_{du}^H R_{uu}^{-1} r_{du} = J(w_{opt}) \quad (12)$$

In practice, for large N, inverting $R_{uu}$ is prohibitively complicated. So a less complicated iterative solution is desirable. A steepest descent method ("SD") provides such a solution. It is given by EQN. (13):

$$w[n+1] = w[n] - \mu\{\nabla J(w[n])\} = w[n] - \mu[R_{uu}[n]w[n] - r_{du}[n]] \quad (13)$$

where $\mu$ is a step size parameter. However, estimating and updating $R_{uu}$ and $r_{du}$ can also be complicated.

By using instantaneous approximations for $R_{uu}$ and $r_{du}$, EQN. (13) can be greatly simplified for practical applications. For example, as shown in EQN. (14) and EQN. (15), $$R_{uu}[n] \approx u[n]u^H[n] \quad (14)$$

and $$r_{du} \approx u[n]d^*[n], \quad (15)$$

the gradient can be given by EQN. (16):

$$\nabla J(w[n]) = 2(R_{uu}[n]w[n] - r_{du}[n]) \quad (16)$$
$$\approx -2u[n][d^*[n] - u^H[n]w[n]]$$
$$\approx -2u[n]e^*[n]$$

A practical LMS algorithm for the equalizer 520, as shown in EQN. (17), can then be determined from EQN. (13):

$$w[n+1] = w[n] - \mu\{\nabla J(w[n])\} \quad (17)$$
$$= w[n] - 2\mu u[n]e^*[n]$$

where $\mu$ is a step size parameter.

FIG. 6 shows a signal-to-noise-plus-interference-ratio ("SINR") plot 600 depicting a plurality of SINRs obtained from a plurality of symbol blocks with an LMS-based LE as discussed above. Similarly, FIG. 7 shows an MSE plot 700 depicting a plurality of MSEs obtained from the plurality of symbol blocks with the LMS-based LE as discussed above. It is well known that SINR and MSE are related as shown in EQN. (18):

$$SINR = 10\log_{10}\frac{\text{signal power}}{MSE} \quad (18)$$

As shown in FIG. 6, time (in terms of symbol blocks processed by the equalizer 520) is measured along an x-axis 604, and SINR is measured along a y-axis 608. FIG. 6 shows an SINR curve 612 for different times after symbols are equalized with the equalizer 520. FIG. 6 shows that the curve 612 converges to an SINR value of about 15 dB after about 3,000 symbol blocks have been equalized, where each block includes 512 symbols. Similarly, as shown in FIG. 7, time is measured along an x-axis 704, and MSE is measured along a y-axis 708. FIG. 7 shows an MSE curve 712 for different times after symbols are equalized with the equalizer 520. FIG. 7 shows that the MSE curve 712 converges to an MSE value of about 1 dB after about 3,000 symbol blocks have been equalized.

In general, equalizer convergence is achieved when the SINR rises above a prescribed value before approaching a SINR convergence value such that subsequent error correction modules, such as the trellis decoder 528 and the Reed-Solomon decoder 536, can nearly completely correct all data errors. For 8VSB, the prescribed value is about 15 dB, and the SINR convergence value, which will depend on channel conditions, must be larger than that prescribed value. An example is shown in FIG. 6, where values of SINR rise above 15 dB before approaching an SINR convergence value of about 16 dB.

FIG. 8 shows an LE system 800 that utilizes the LMS algorithm as discussed. The LE system 800 includes a linear transversal filter 804 with tap weights w fed by an input data vector u[n]. The filter 804 has an output y[n] that feeds a non-linear decision device 808. The decision device 808 has an output d[n] that is a set of likely symbols transmitted. The output d[n] is subtracted from the output y[n] to create an error signal e[n]. The error signal e[n] is used by an LMS algorithm 812 to update the tap weights w of the filter 804 for time n+1.

SUMMARY

The following summary sets forth certain exemplary embodiments of the invention. It does not set forth all embodiments of the invention and should in no way be construed as limiting of embodiments of the invention.

In one embodiment, the invention includes a method of channel tracking in an adaptive equalizer for a digital data receiver. The method includes determining a first set of tap weights and a second set of tap weights of the equalizer, and determining a difference between the first and second sets of tap weights. The method also includes determining an error estimate based on symbols received at the receiver, comparing the error estimate with a divergence threshold, and determining a step size factor based on the difference and the comparison.

In another embodiment, the invention includes an adaptive equalizer for a digital data receiver, wherein data received by the receiver includes coded symbols. The equalizer includes a tap weight module, a difference module, an error estimator, a comparison module, and a step size factor module. The tap weight module determines a first set of tap weights and a second set of tap weights of the equalizer. The difference module determines a difference between the first and second sets of tap weights. The error estimator determines an error estimate based on symbols received at the receiver. The comparison module compares the error estimate with a divergence threshold, and the step size factor module determines a step size factor based on the difference and the comparison.

In another embodiment, the invention includes a device configured to process digital television signals. The device includes a receiver that includes a demodulator, a decoder, and an equalizer. The receiver receives radio frequency signals modulated with data including coded symbols and uncoded symbols, the demodulator demodulates the received radio frequency signals to produce the coded symbols and the uncoded symbols, and the decoder decodes the coded symbols to produce corresponding decoded symbols. The equalizer includes a tap weight module, a difference module, an error estimator, a comparison module, and a step size factor module. The tap weight module determines a first set of tap weights and a second set of tap weights of the equalizer. The difference module determines a difference between the first and second sets of tap weights. The error estimator determines an error estimate based on symbols received at the receiver. The comparison module compares the error estimate with a divergence threshold, and the step size factor module determines a step size factor based on the difference and the comparison.

Other aspects of the invention will become apparent by consideration of the detailed description and accompanying drawings.

DETAILED DESCRIPTION

Figure 1:
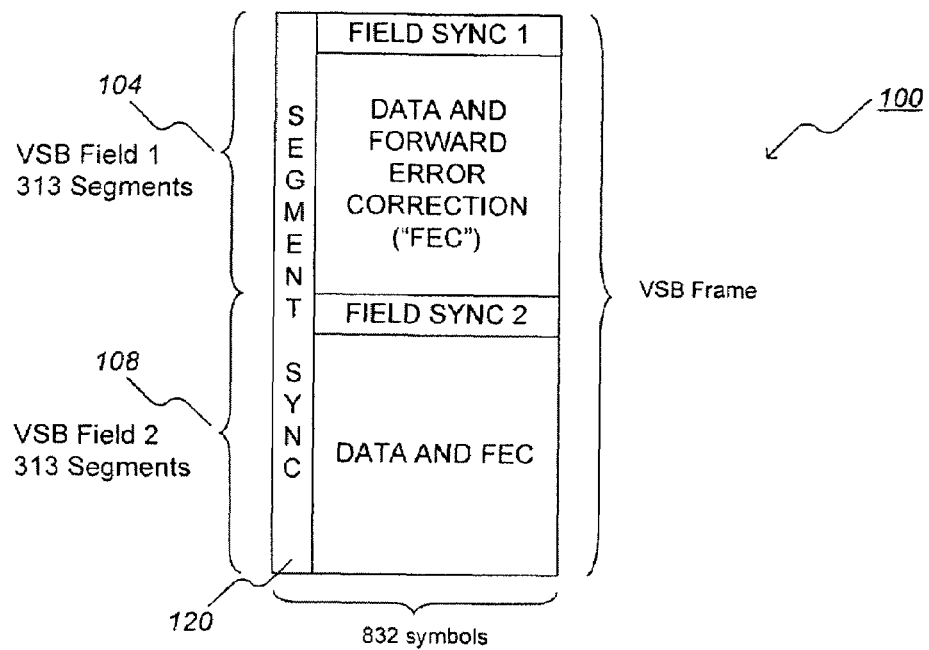
FIG. 1 shows an exemplary 8VSB data frame.
Figure 2:
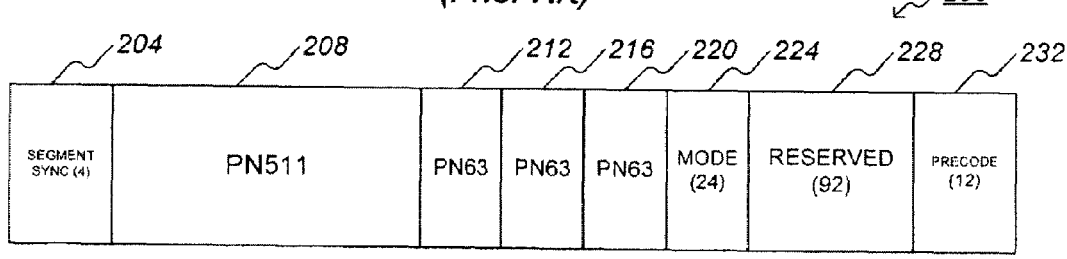
FIG. 2 shows an exemplary field sync segment.
Figure 3:
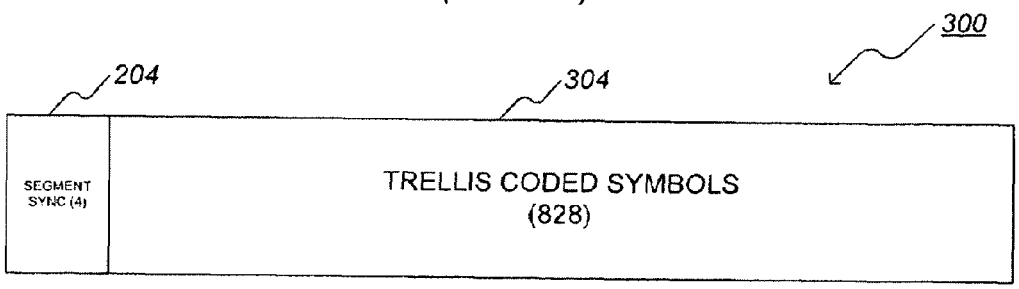
FIG. 3 shows an exemplary data segment.
Figure 4:
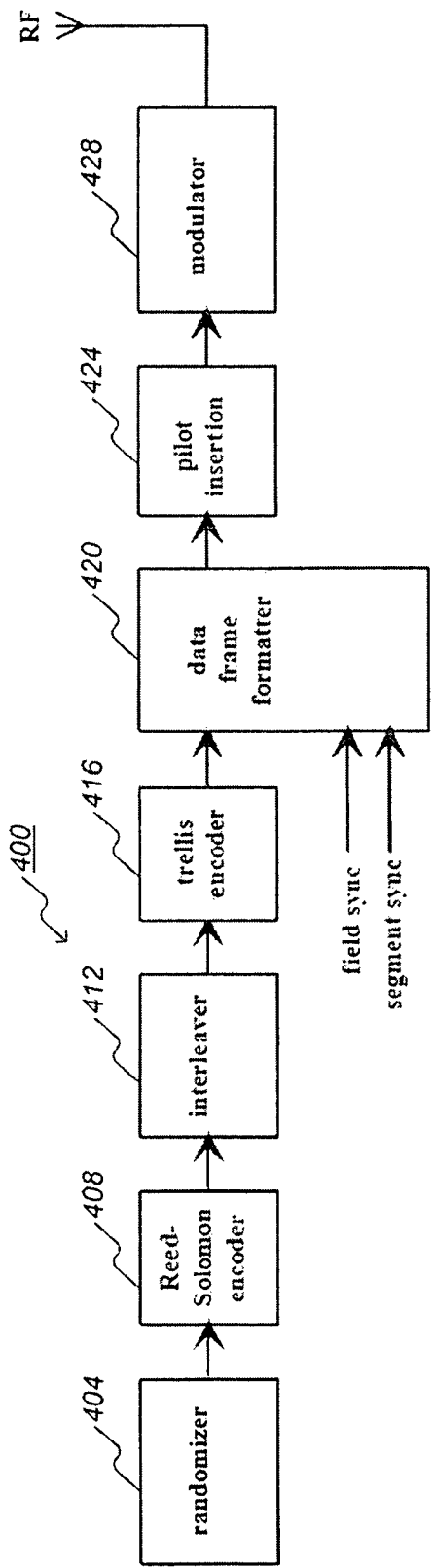
FIG. 4 shows an exemplary digital data transmitter.
Figure 5:
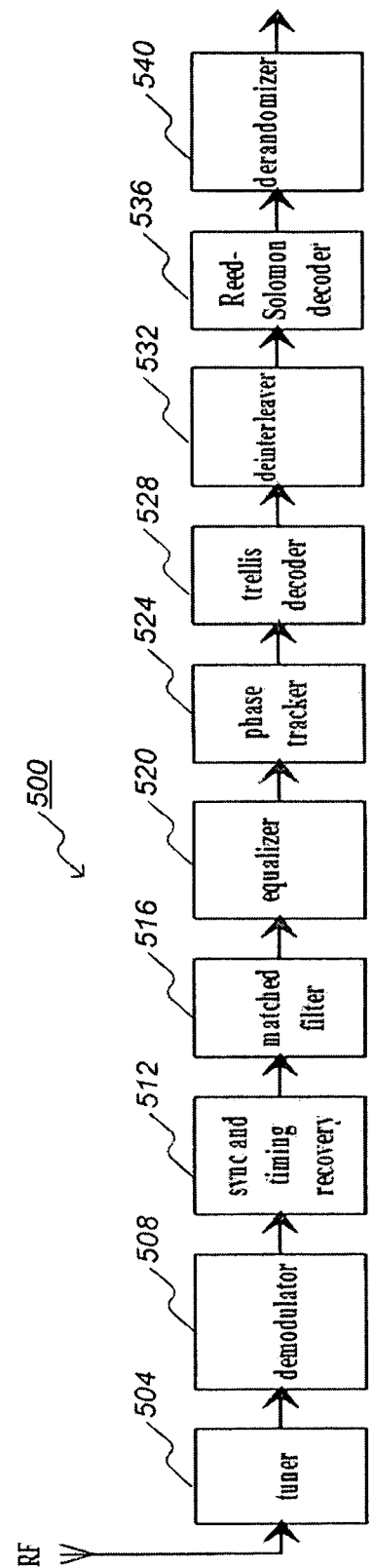
FIG. 5 shows an exemplary digital data receiver.
Figure 6:
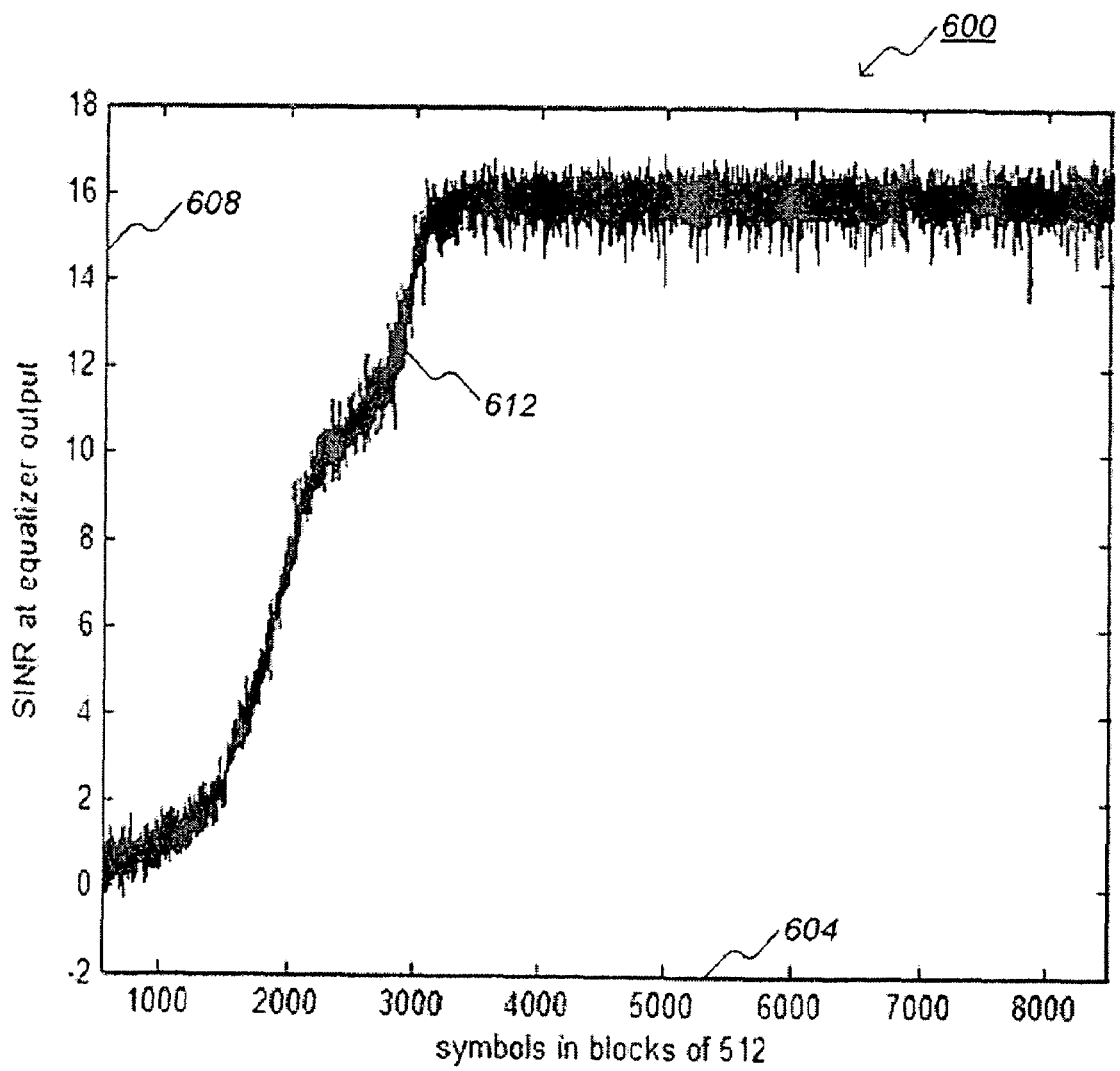
FIG. 6 shows a signal-to-noise-plus-interference-ratio ("SINR") plot depicting a plurality of SINRs obtained from a plurality of symbol blocks with the equalizer of FIG. 5.
Figure 7:
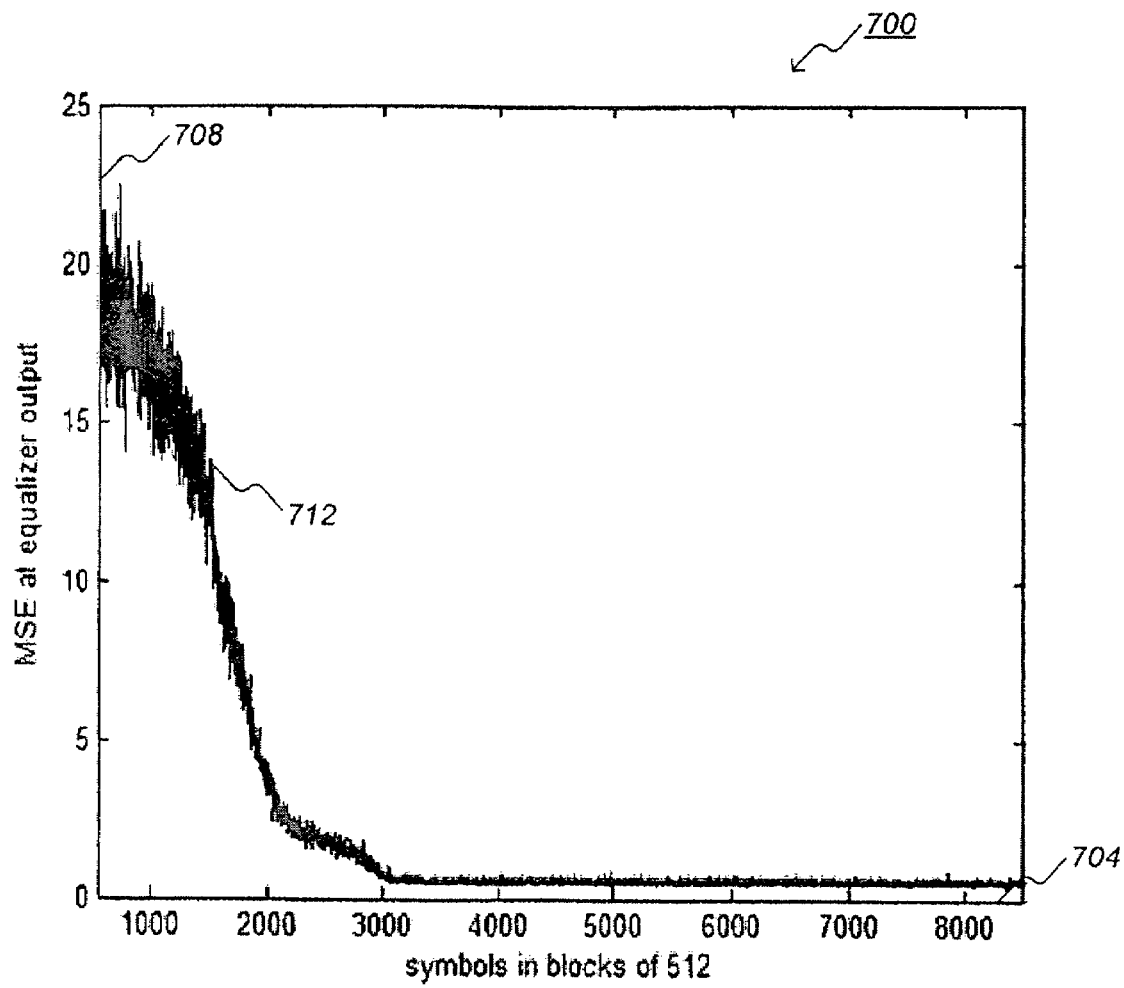
FIG. 7 shows a mean-squared-error ("MSE") plot depicting a plurality of MSEs obtained from a plurality of symbol blocks with the LMS-based linear equalizer of FIG. 5.
Figure 8:
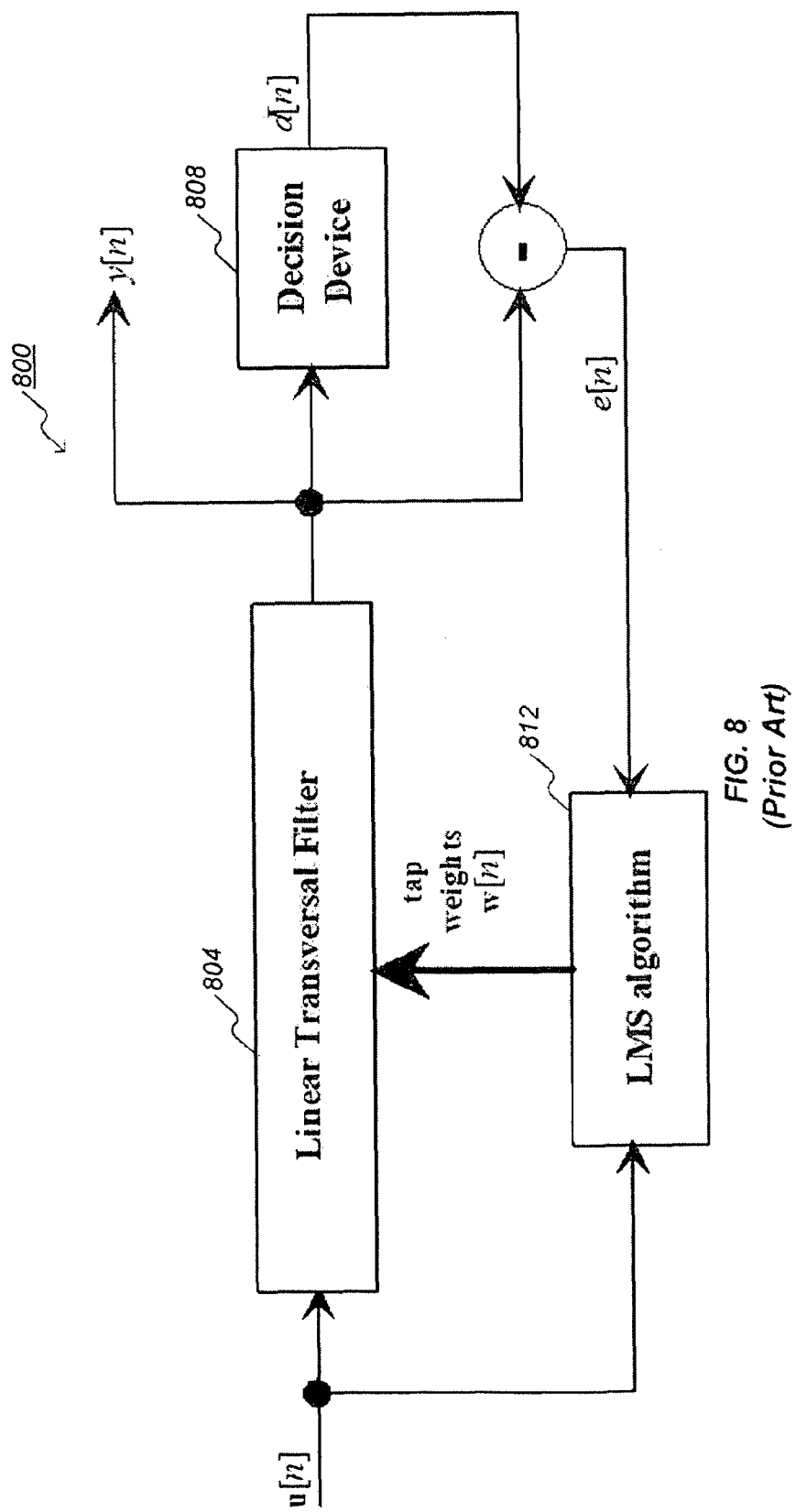
FIG. 8 shows a typical linear equalizer system having a decision device.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items.

As should also be apparent to one of ordinary skill in the art, the systems shown in the figures are models of what actual systems might be like. Many of the modules and logical structures described are capable of being implemented in software executed by a microprocessor or a similar device or of being implemented in hardware using a variety of components including, for example, application specific integrated circuits ("ASICs"). Terms like "equalizer" or "decoder" may include or refer to both hardware and/or software. Furthermore, throughout the specification capitalized terms are used. Such terms are used to conform to common practices and to help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

As noted above, the step size $\mu$ of EQN. (17) controls a rate at which the LMS adaptive equalizer tap weights w converge to near an optimum $w_{opt}$. It is desirable to use a larger step size to decrease the amount of time needed until convergence is obtained. However, a larger step size leads to a larger steady state MSE, or lower SINR, at the output of an equalizer after convergence. Hence, after the equalizer is close to convergence, a smaller step size is desirable. Therefore, it is generally advantageous to have a variable step size whose value depends on a "closeness" of w to $w_{opt}$, thereby enabling a receiver to use a larger step size while the adaptive filter is converging and a smaller step size after convergence.

The ability of an adaptive equalizer to track a nonstationary channel is also a concern in appropriately choosing a step size $\mu$. If the equalizer converges close to the optimal tap weight vector $w_{opt}$ and is running with a small step size, but then the channel conditions change, the equalizer must adequately track and adapt the tap weight vector w. Detection of changes in channel conditions and a switch to a larger step size $\mu$, even though the equalizer has previously converged, is advantageous in this situation.

Embodiments of the invention include methods, systems, and devices for adaptively selecting a step size of an equalizer. In one specific embodiment, an adaptive equalizer selectively uses coded symbols or uncoded symbols to determine a step size by which to update tap weights used by a transversal filter. Selective use of coded symbols or uncoded symbols can enable a more accurate estimation of error throughout various states of the equalizer, which estimation in turn can be employed to determine an appropriate step size. For instance, uncoded symbols may be employed before a predetermined convergence state of the equalizer, and coded symbols may be employed once the predetermined convergence state is reached.

Embodiments herein can achieve improved performance than that achieved in existing digital communication receivers. For instance, embodiments herein can be employed to respond adaptively to changing channel conditions and more effectively select an appropriate step size. In one embodiment, iterative processes are employed to detect when current tap weights are no longer sufficiently close to optimal tap weights, and to modify the step size based on coded symbols or uncoded symbols as appropriate, so as to move closer to the optimal tap weight solution.

Although some embodiments herein focus on processing (e.g., reception) of digital television signals, the invention may be implemented in connection with other kinds of digital signals. Similarly, although some embodiments herein relate to the 8VSB RF modulation format, the invention may be implemented in connection with other modulation formats, such as formats that include coded information and a priori known information.

Additionally, although some embodiments herein relate to linear equalizers ("LEs"), the invention may be implemented in connection with other equalizer architectures, such as, for example, decision feedback equalizers ("DFEs") and predictive decision feedback equalizers ("pDFEs").

Figure 9A:
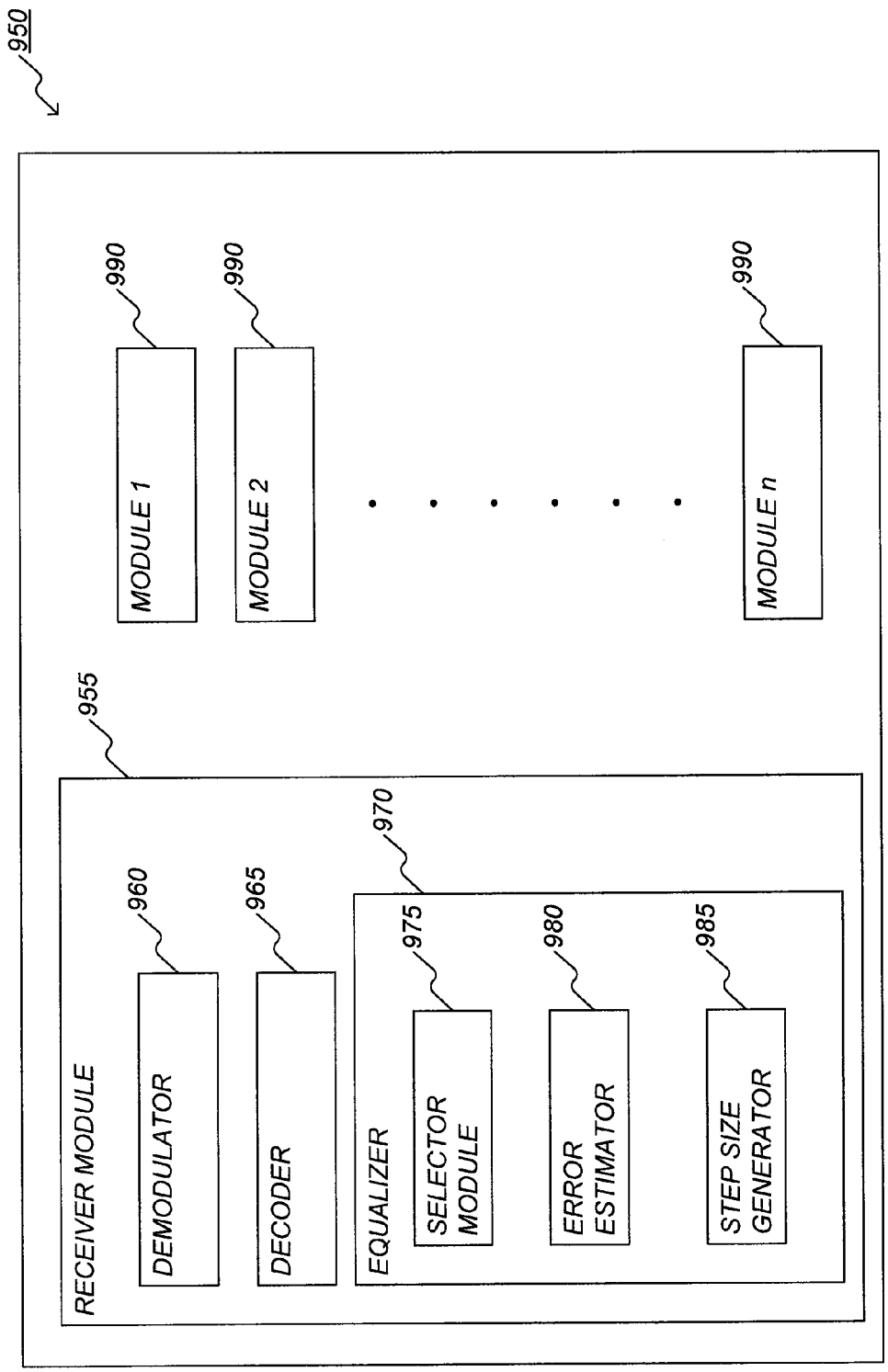
FIG. 9A shows a digital communications device according to an embodiment of the invention.

FIG. 9A shows a digital communications device 950 according to an embodiment of the invention. The device 950 can be implemented as, or in conjunction with, any of a host of devices, such as, for example, a receiver (e.g., digital communication receiver), tuner, PC adapter card, set top box, DVD recorder, HDTV recorder, television, phone, or handheld device. The device 950 can be implemented partially or entirely on a semiconductor (e.g., FPGA semiconductor) chip, such as a chip developed through a register transfer level (RTL) design process. The device 950 includes a receiver module 955 and optional hardware and/or software module(s) 990 that provide additional functions (e.g., display functions). In other embodiments, the device 950 includes more or fewer modules than those depicted. For example, certain of the depicted modules can be implemented on other devices that interface with the device 950 (e.g., the receiver module 955 can communicate with a display module incorporated in a separate device).

The receiver module 955 includes a demodulator 960, a decoder 965, and an equalizer 970. In some embodiments, the receiver module 955 includes one or more additional modules, such as, for example, a tuner, a sync and timing recovery module, a matched filter, a phase tracker, a deinterleaver, a second decoder, a slicer, and/or a derandomizer. The equalizer 970 includes a selection module 975, an error estimator 980, and a step size generator 985. Exemplary implementations of the equalizer 970 are described in further detail below.

Figure 9B:
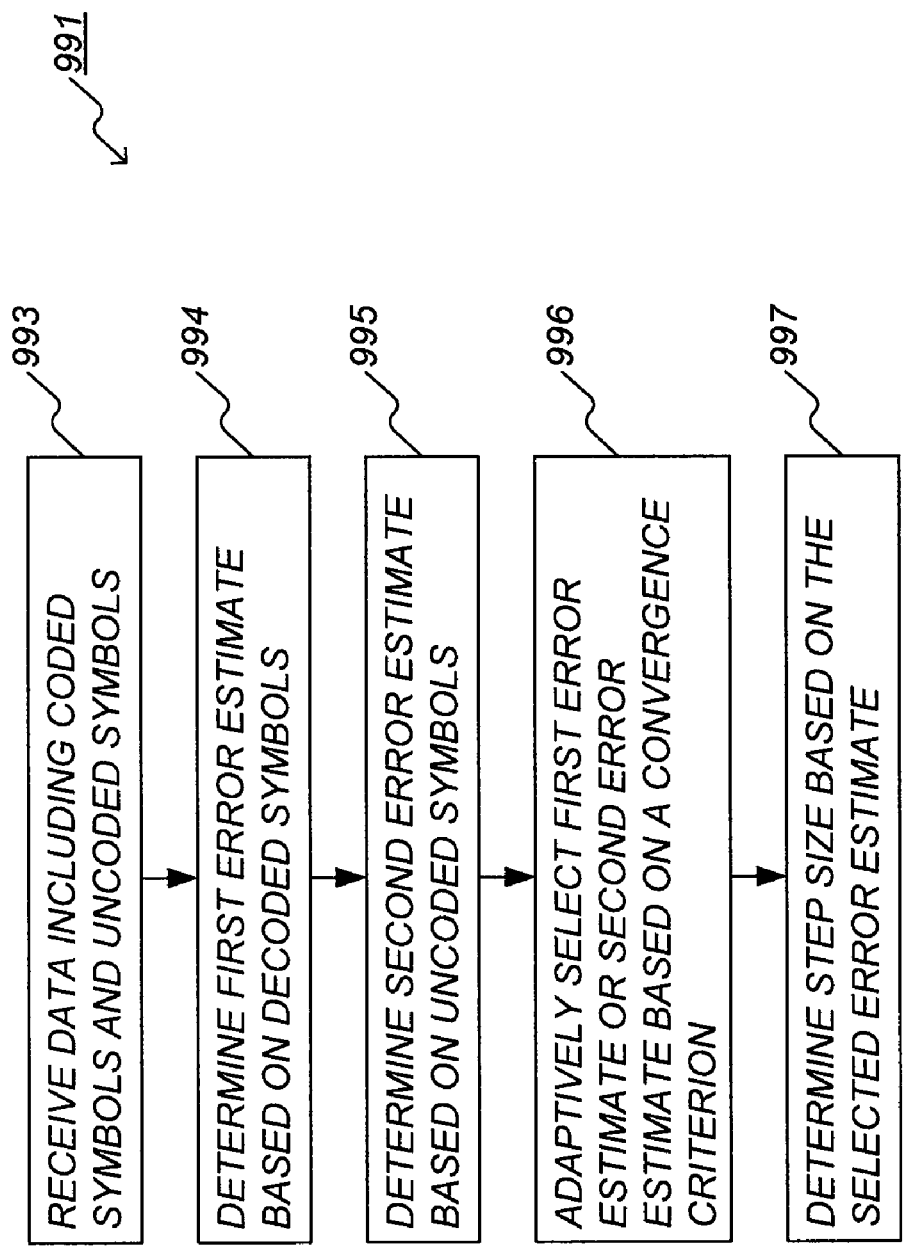
FIG. 9B shows a method according to an embodiment of the invention.

FIG. 9B shows a method 991 according to an embodiment of the invention. The method 991 can be employed by, or in conjunction with, an equalizer for a digital data receiver in order to determine a step size of the equalizer. For instance, the method 991 can be employed by the receiver module 955 and/or equalizer 970 of FIG. 9A, as well as in connection with other embodiments described below. In task 993, data is received that includes coded symbols and uncoded (e.g., a priori known) symbols. In task 994, a first error estimate is determined based on decoded symbols corresponding to the coded symbols. In task 995, a second error estimate is determined based on the uncoded symbols. In task 996, the first error estimate or the second error estimate is adaptively selected based on a convergence criterion. In task 997, a step size is determined based on the selected error estimate. The method 991 can be iteratively performed as a datastream is received and processed.

Variations of the method 991 are within the scope of embodiments of the invention. For instance, in one embodiment, a method selects either decoded symbols or uncoded symbols based on a convergence criterion; determines a signal estimate based on the selected symbols; determines an error estimate based on received data and the signal estimate; and determines a step size based on the error estimate.

Figure 9C:
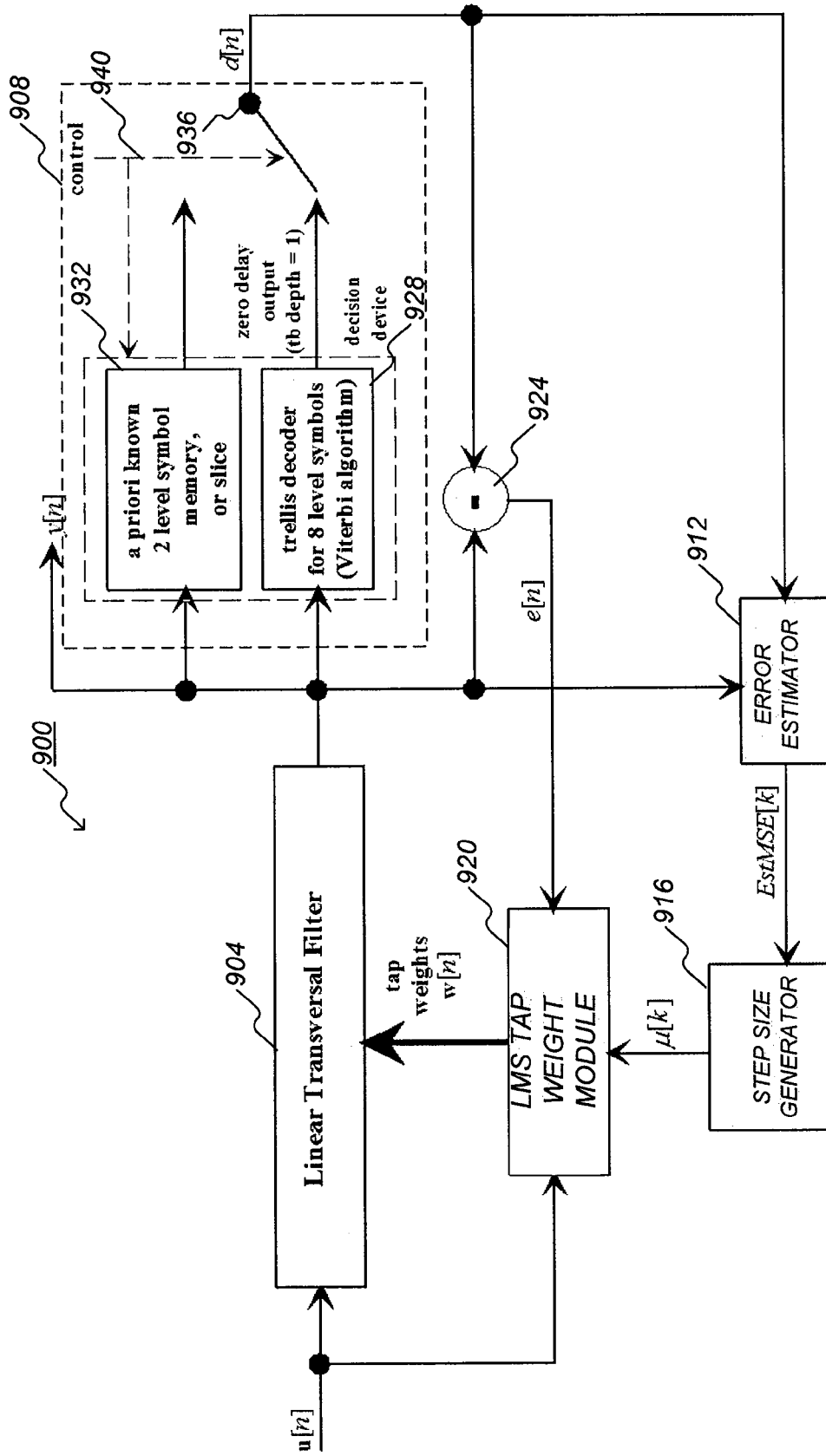
FIG. 9C shows a linear equalizer according to an embodiment of the invention.

FIG. 9C shows a linear equalizer ("LE") 900 according to an embodiment of the invention that can be implemented in a digital receiver. The equalizer 900 includes a linear transversal filter 904 having tap weights w and an output y[n], a selection module 908, an error estimator 912, a step size generator 916 that generates a step size parameter μ[k], and an LMS tap weight module 920 that adjusts the tap weights w based on the step size parameter μ[k]. In some embodiments, the error estimator 912 includes an MSE estimator. In such cases, the step size generator 916 generates the step size parameter μ[k] based on error information provided by the MSE estimator. Although FIG. 9C shows an LE, other types of equalizers, such as DFEs and pDFEs, can be employed.

As previously noted, 8VSB signals include a combination of 8-level trellis coded symbols and uncoded 2-level symbols. The selection module 908 generates an output d[n], which in turn is subtracted from y[n] to obtain e[n] at a summing node 924. The selection module 908 also feeds the output d[n] to the error estimator 912. The selection module 908 includes a trellis decoder 928 that decodes the coded symbols at the equalizer output y[n] using the Viterbi algorithm. In the embodiment shown, the decoder 928 has a zero delay or a traceback depth of one output. While longer traceback depth decisions are generally more reliable, they incur a longer delay, which can be unacceptable if an instantaneous e[n] is needed for the LMS update.

Most of the uncoded symbols including all segment sync symbols and the first 728 symbols of the field sync segment are a priori known. These are perfectly "decoded" by reading them out of a memory at appropriate times. The 92 unknown 2-level symbols at the end of the field sync segment are decoded by slicing at a midpoint with a slicer 932 since the unknown symbols are 2-level symbols.

Through a control line 940, a synchronizing control signal indicates to the selection module 908 and a switch 936 which type of symbol is being decoded. Exemplary methods for deriving this control signal first require symbol clock recovery, then data field synchronization, both of which occur in the preceding sync and timing recovery block, and then a modulo 260,416 symbol clock rate counter feeding a comparator that activates the control line 940 according to the type of symbol.

The error estimator 912 controls the adjustable step size parameter μ[k] that is being fed to the LMS module 920. In one embodiment, the error estimator 912 includes a high MSE indicator and a low MSE indicator. A high MSE (low SINR) indicates that w is not close to $w_{opt}$, and thus a need for a larger step size. A low MSE (high SINR) indicates that w is close to $w_{opt}$, and thus a desirability of a smaller step size. An exemplary method of MSE estimation (or, equivalently, SINR estimation) for the 8VSB signal is discussed below.

In some embodiments, the error estimator 912 periodically estimates an error, such as an MSE, every block of M symbols times from the trellis decoded symbols outputted by the decoder 928 as follows. For example, in the case of an MSE estimate, an instantaneous MSE estimate at block time k is given by EQN. (19).

$$\xi_{dec}^2[k] = \left(\frac{1}{M}\right)\sum_{i=0}^{M-1}(y[m+i]-d[m+i])^2 \qquad (19)$$

where k is a block index, symbol index base m=(k−1)M, y is the equalizer output, d is the zero delay output of the trellis decoder 928, and M is a selected block size. Similarly, in the case of an MSE estimate, an averaged MSE estimate is given by EQN. (20).

$$\xi_{dec,\beta}^2[k]=(1-\beta_{dec})\xi_{dec}^2[k]+\beta_{dec}\xi_{dec,\beta}^2[k-1],$$
$$0<\beta_{dec}<1 \qquad (20)$$

Note that values of $\beta_{dec}$ are typically close to 1, with a smaller value providing a noisier MSE estimate but faster tracking of a changing MSE.

Figure 10:
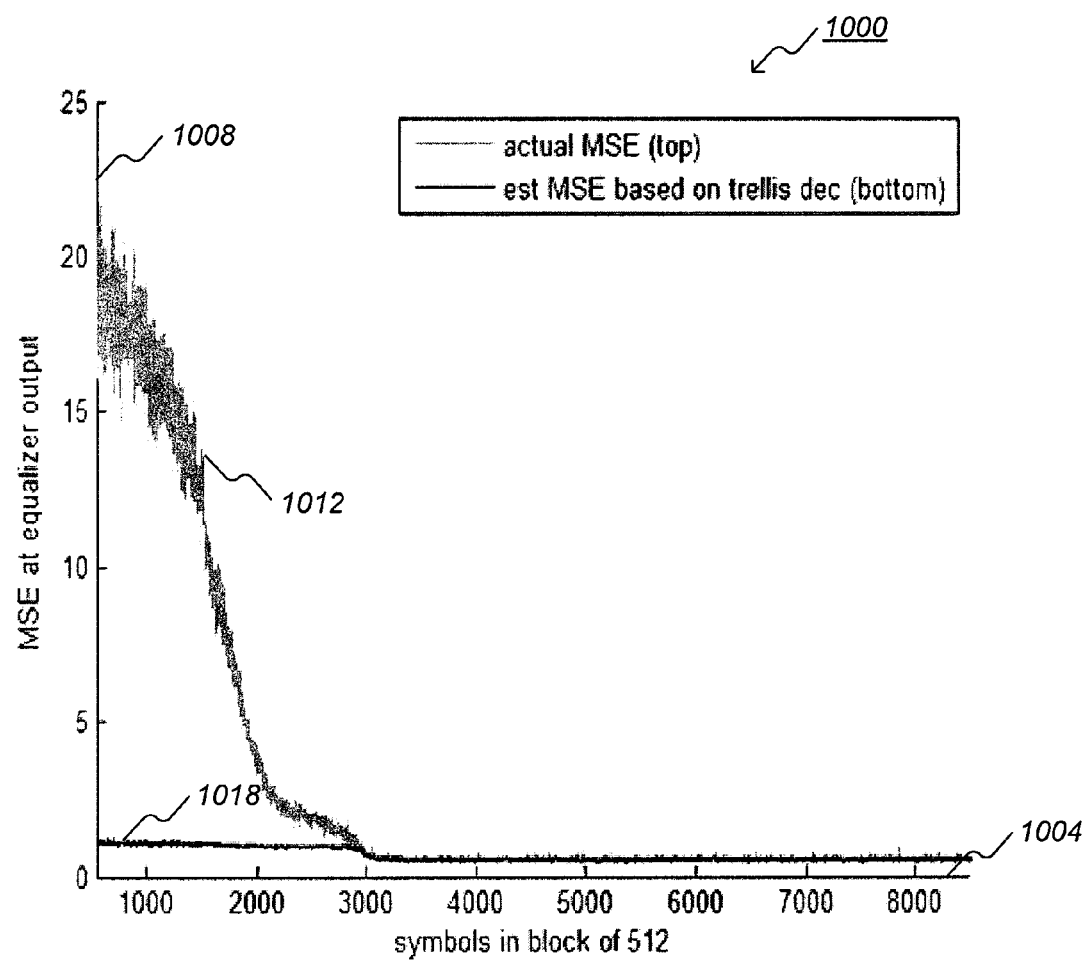
FIG. 10 shows an MSE estimate plot based on coded symbols.

FIG. 10 shows an estimate plot 1000. Times (in terms of symbol blocks at the output of the equalizer 900) are measured along an x-axis 1004, and values of the MSE are measured along a y-axis 1008. A curve 1012 shows actual MSEs obtained, and a curve 1018 shows values of the MSE estimate $\xi_{dec,\beta}^2$. FIG. 10 shows that when the actual MSEs (curve 1012) are above about 0.9 (equivalent to an SINR below 13.75 dB), the estimated MSE $\xi_{dec,\beta}^2$ is considerably below the actual MSE.

Alternatively, error values may be estimated using only the a priori known 2-level segment sync symbols. For example, in the case of an MSE estimate, whenever d[p] ... d[p+3] are segment sync symbols, then an instantaneous MSE estimate at segment j is given by EQN. (21).

$$\xi_{seg}^2[j] = \left(\frac{1}{4}\right)\sum_{i=0}^{3}(y[p+i]-d[p+i])^2 \quad (21)$$

where j is a segment index, and p=832(j−1) is a symbol index (note that blocks k and segments j are in general asynchronous). Similarly, in the case of an MSE estimate, whenever d[p]... d[p+3] are segment sync symbols, then an averaged MSE estimate is given by EQN. (22).

$$\xi_{seg,\beta}^2[j]=(1-\beta_{seg})\xi_{seg}^2[j]+\beta_{seg}\xi_{seg,\beta}^2[j-1], \; 0<\beta_{seg}<1 \quad (22)$$

Note that values of $\beta_{seg}$ are typically close to 1, with a smaller value providing a noisier MSE estimate but faster tracking of a changing MSE.

Figure 11:
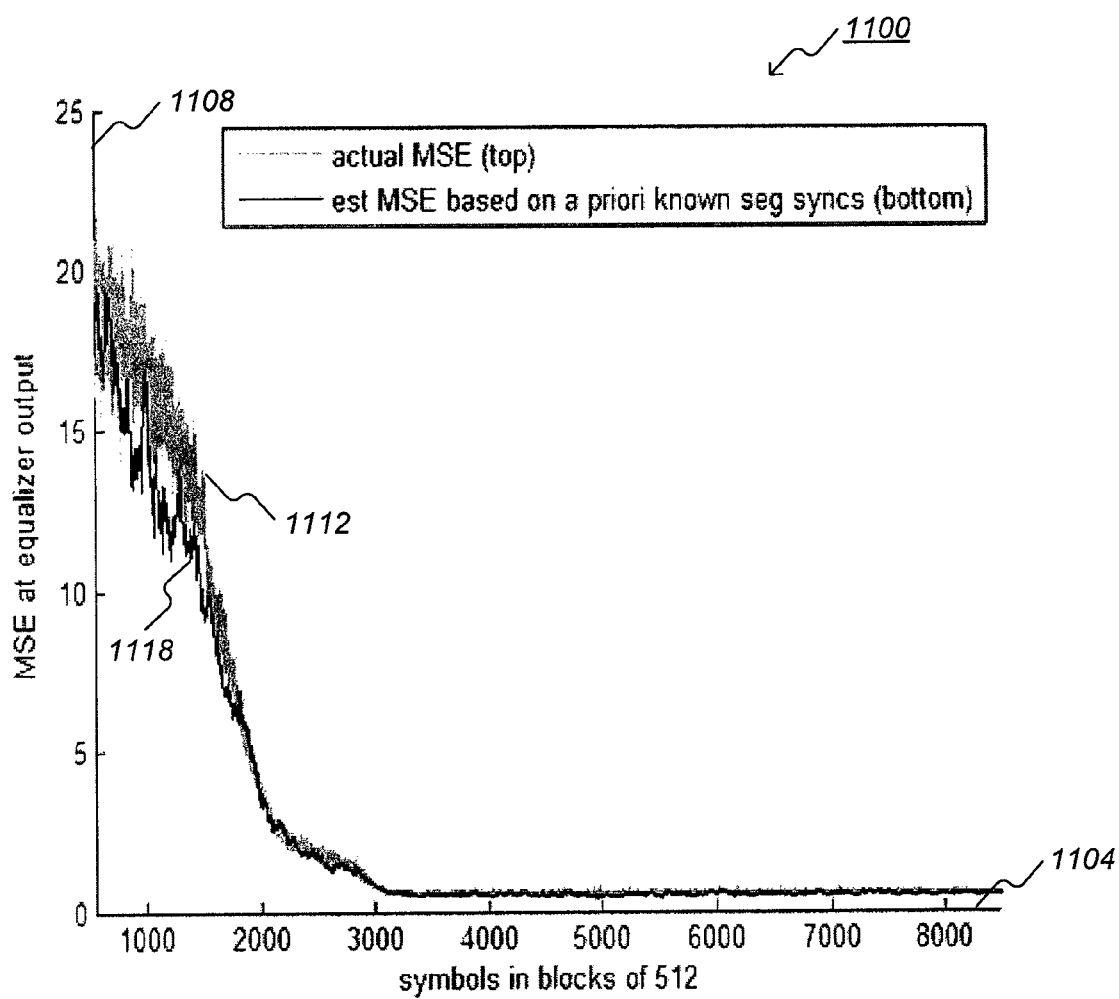
FIG. 11 shows an estimate plot based on uncoded symbols.

FIG. 11 shows an estimate plot 1100. Times (in terms of symbol blocks at the output of the equalizer 900) are measured along an x-axis 1104, and values of the MSE are measured along a y-axis 1108. A curve 1112 shows actual MSEs obtained, and a curve 1118 shows values of the MSE estimate $\xi_{seg,\beta}^2$. FIG. 11 shows that values of $\xi_{seg,\beta}^2$ are more accurate than $\xi_{dec,\beta}^2$ at high MSE (low SINR).

Figure 12:
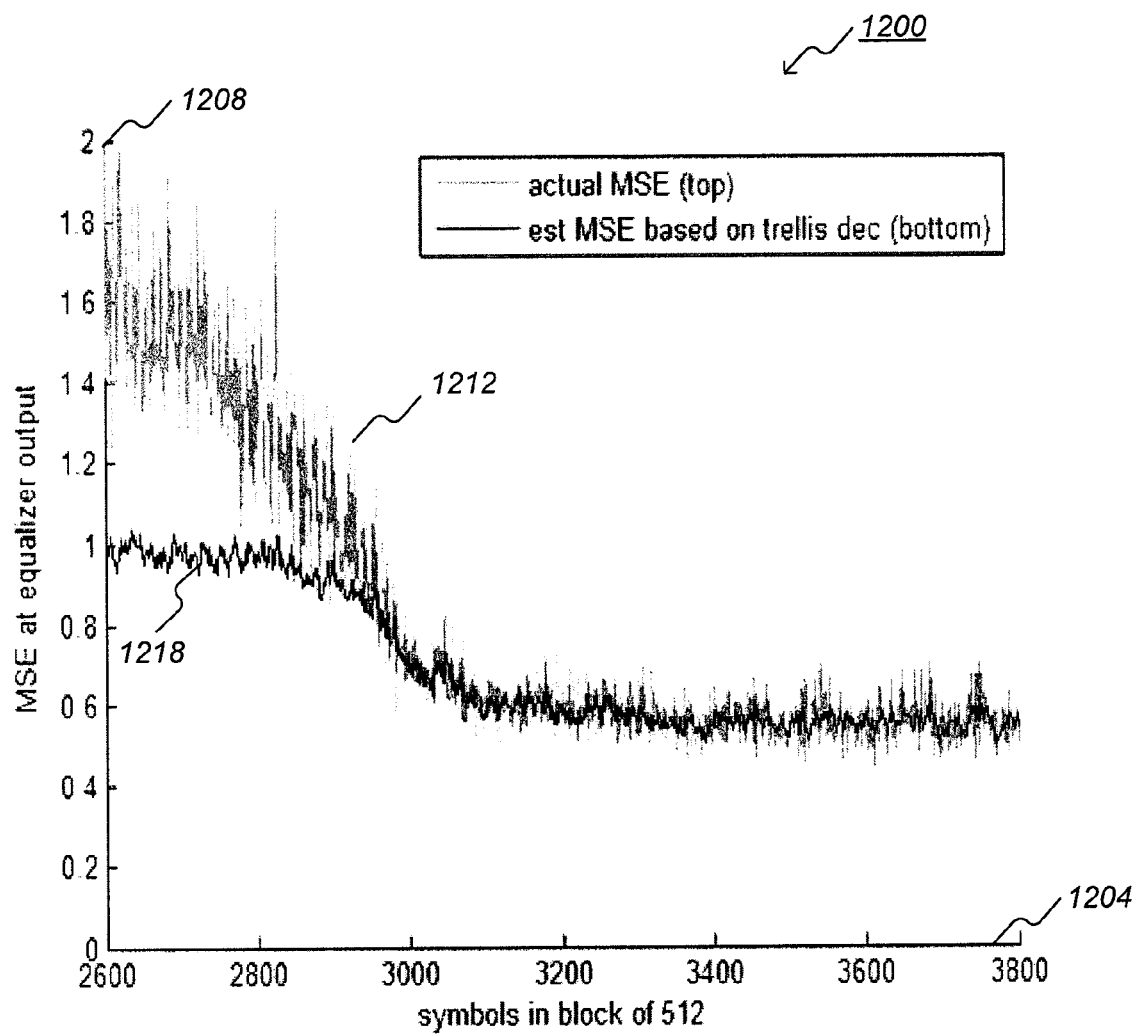
FIG. 12 shows an estimate plot showing a portion of the plot of FIG. 10.
Figure 13:
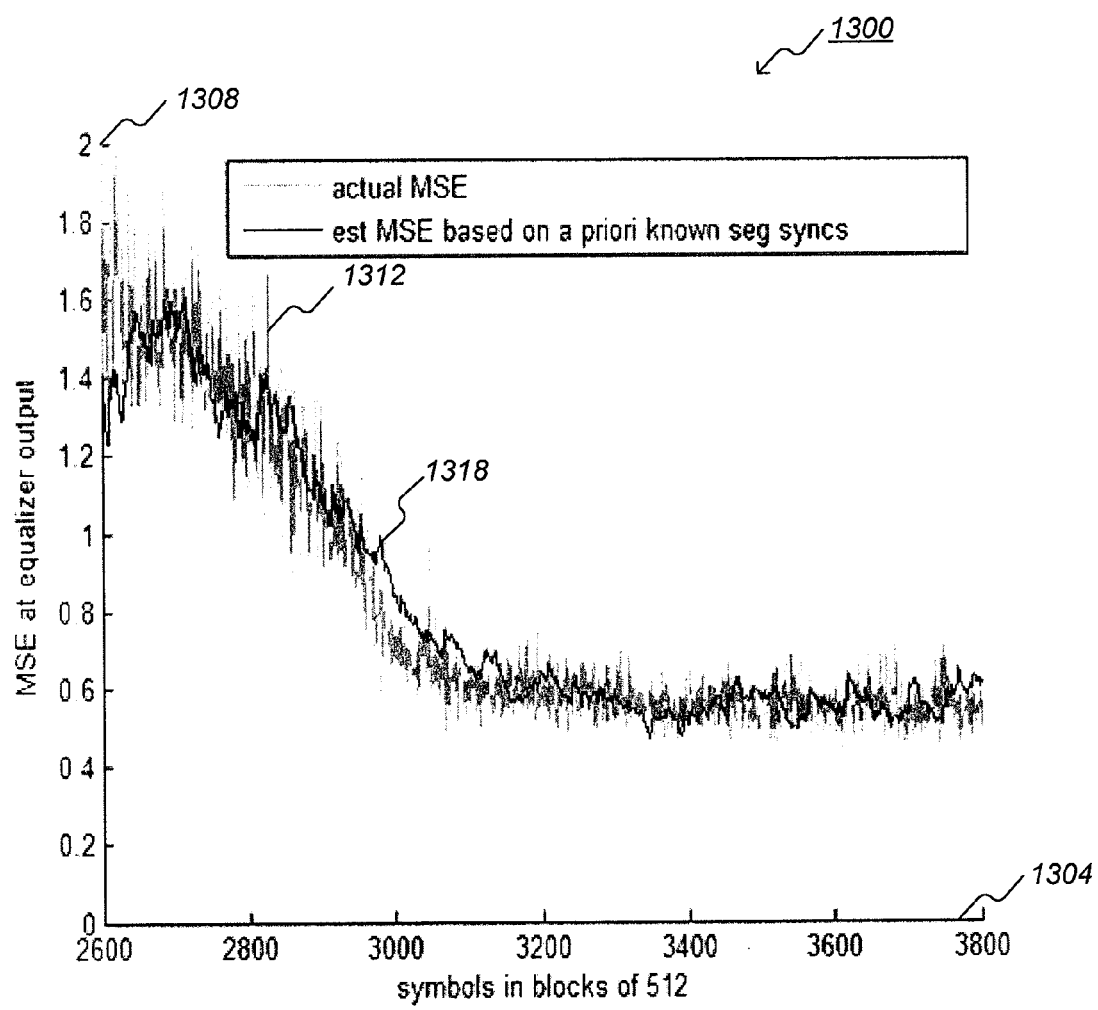
FIG. 13 shows an estimate plot showing a portion of the plot of FIG. 11.

FIG. 12 shows an estimate plot 1200 showing a portion of the plot 1000 of FIG. 10 between symbol blocks 2600 and 3800. Times (in terms of symbol blocks at the output of the equalizer 900) are measured along an x-axis 1204, and values of the MSE are measured along a y-axis 1208. A curve 1212 shows actual MSEs obtained, and a curve 1218 shows values of the MSE estimate $\xi_{dec,\beta}^2$. Similarly, FIG. 13 shows an estimate plot 1300 showing a portion of the plot 1100 of FIG. 11 between symbol blocks 2600 and 3800. Times (in terms of symbol blocks at the output of the equalizer 900) are measured along an x-axis 1304, and values of the MSE are measured along a y-axis 1308. A curve 1312 shows actual MSEs obtained, and a curve 1318 shows values of the MSE estimate $\xi_{dec,\beta}^2$.

As shown in FIG. 12 and FIG. 13, while the $\xi_{seg,\beta}^2$ estimate is better than $\xi_{dec,\beta}^2$ at high MSE, the $\xi_{seg,\beta}^2$ estimate is noisier than $\xi_{dec,\beta}^2$ as MSE decreases because $\xi_{seg}^2$ is averaged over fewer symbols than is $\xi_{dec}^2$ (4<<M). Thus, $\xi_{seg}^2$ represents a noisier estimate of the actual MSE. As such, each of the two methods provides relatively better estimates for respective MSE regions. Hence, according to various embodiments of the invention, these methods are selectively combined to provide a more accurate MSE estimate both at low and high MSE.

For example, in one embodiment involving EQN. (23) and EQN. (24), if $\xi_{dec,\beta}^2$ is less than a predetermined MSE value (e.g., associated with a convergence state), the step size generator 916 selects $\xi_{dec,\beta}^2$ as the error estimate EstMSE. If $\xi_{dec,\beta}^2$ is greater than or equal to the predetermined MSE value, the step size generator 916 selects $\xi_{seg,\beta}^2$ as the error estimate EstMSE. In some embodiments, the predetermined MSE value is about 0.9. That is, If $\xi_{dec,\beta}^2[k]<0.9$, (equivalent to SINR>13.75 dB)

EstMSE[k]=$\xi_{dec,\beta}^2[k]$ (near or post convergence) (23)

Else

EstMSE[k]=$\xi_{seg,\beta}^2[j]$ (pre convergence) (24)

Figure 14:
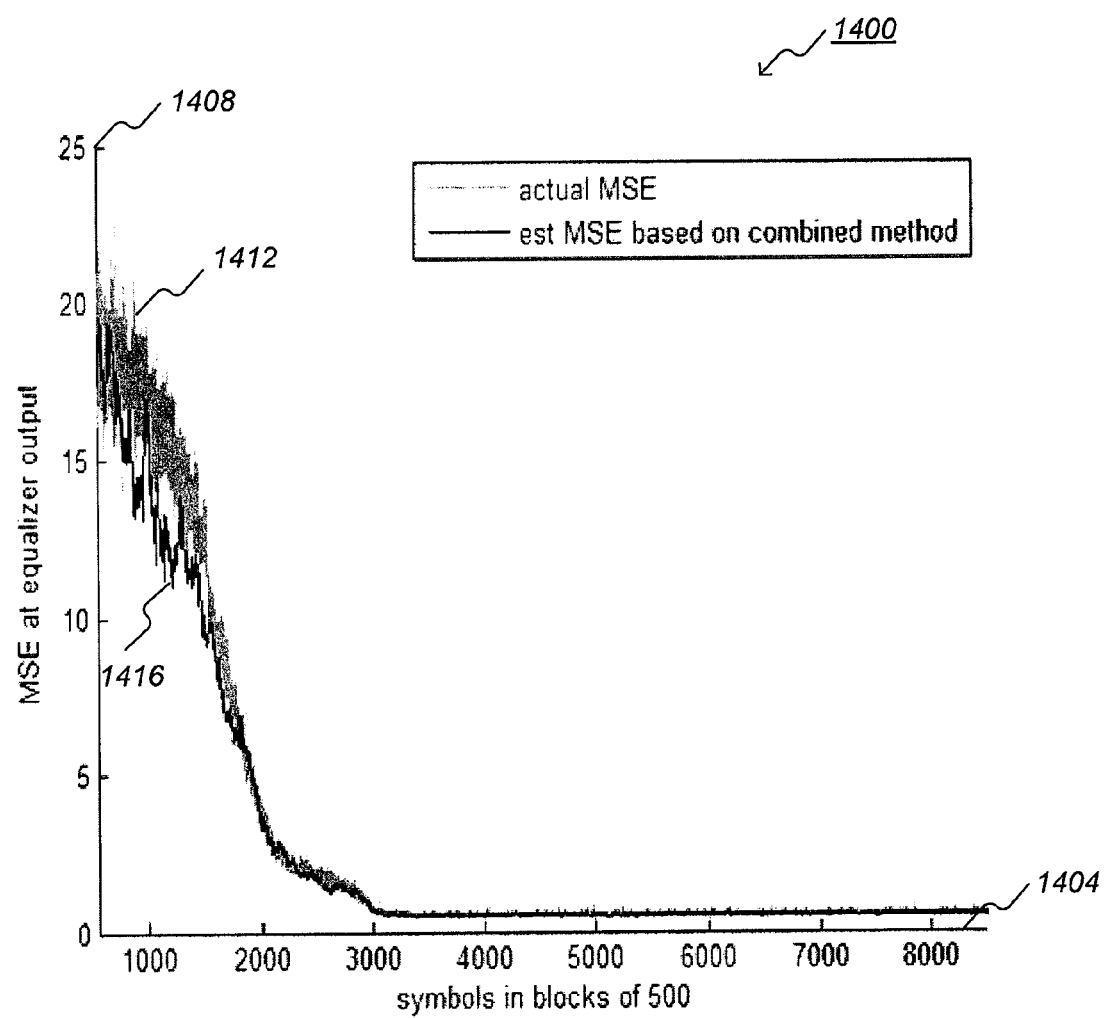
FIG. 14 shows an estimate plot based on selective use of coded and uncoded symbols.
Figure 15:
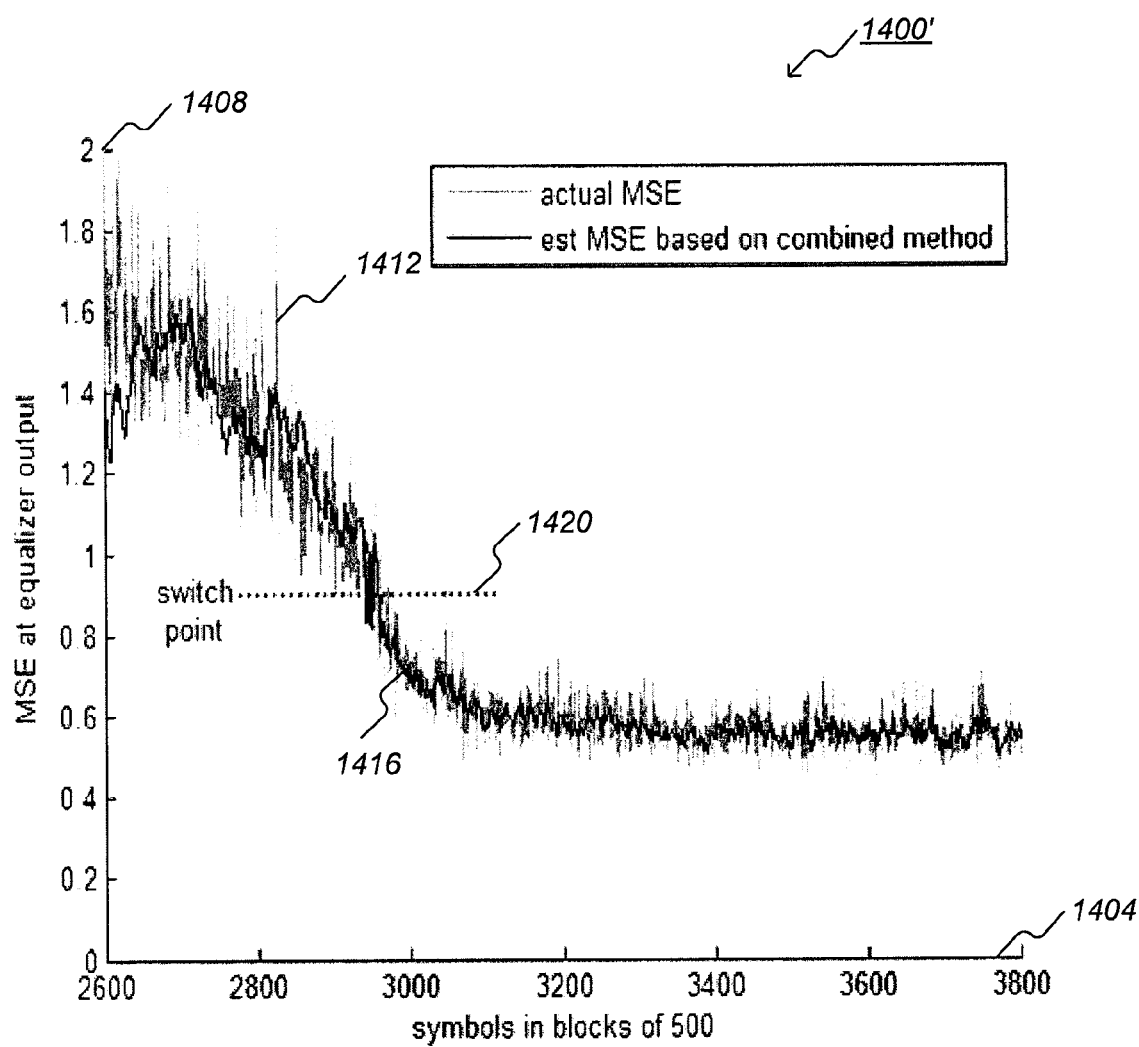
FIG. 15 shows an estimate plot showing a portion of the plot of FIG. 14.

FIG. 14 shows an error estimate plot 1400 based on selectively combining use of coded and uncoded symbols. Times (in terms of symbol blocks at the output of the equalizer 900) are measured along an x-axis 1404, and values of the MSE in dB are measured along a y-axis 1408. A curve 1412 shows actual MSEs obtained, and a curve 1416 shows values of the MSE estimate EstMSE determined by EQNS. (21)-(24) and associated logic. FIG. 15 similarly shows a portion 1400' of the estimate plot 1400 from symbol blocks 2600 to 3800. The portion 1400' shows the error estimator 912 transitioning from use of uncoded symbols (i.e., $\xi_{seg,\beta}^2$) to use of coded symbols (i.e., $\xi_{dec,\beta}^2$) at a switch point 1420. In the embodiment shown, the switch point is set at about MSE=0.9.

Once the error estimator 912 has determined an error estimate, the step size generator 916 uses the error estimate EstMSE[k] to select a variable LMS step size depending on a range within which the error estimate EstMSE[k] falls. For example, as shown in expression (25), if the error estimate EstMSE[k] falls within a range $R_r$, the step size generator 916 sets the step size parameter $\mu[k]$ equal to a predetermined step size $\mu_r$.

If EstMSE[k]∈$R_r$, $\mu[k]=\mu_r$ (25)

end

In one embodiment, smaller values of EstMSE correspond to lower values of $\mu_r$. For example, the step size generator 916 can use three EstMSE[k] ranges: a first range $R_1$, a second range $R_2$, and a third range $R_3$. If EstMSE[k] is within the first range $R_1$, which is less than or equal to 0.7 dB (equivalent to an estimated SINR of about 14.75 dB), the step size generator 916 uses a step size of $\mu_1$. Similarly, if EstMSE[k] is within the second range $R_2$, which is between 0.7 dB and 0.9 dB (equivalent to an estimated SINR of about 13.75 dB), the step size generator 916 uses a step size of $\mu_2$. If EstMSE[k] is within the third range $R_3$, which is above 0.9 dB, the step size generator 916 uses a step size of $\mu_3$. In such cases, $\mu_1$ is the smallest among the three step sizes, and $\mu_3$ is the largest among the three step sizes.

In other embodiments, the step size generator 916 determines the step size differently. For instance, the step size generator 916 may employ a function (e.g., a continuous function) that computes the step size based on information received from the error estimator 912. In some embodiments, the step size is given by EQN. (25').

$\mu[k]=\gamma$EstMSE[k] (25')

where $\gamma$ is a predetermined positive real constant.

Figure 16:
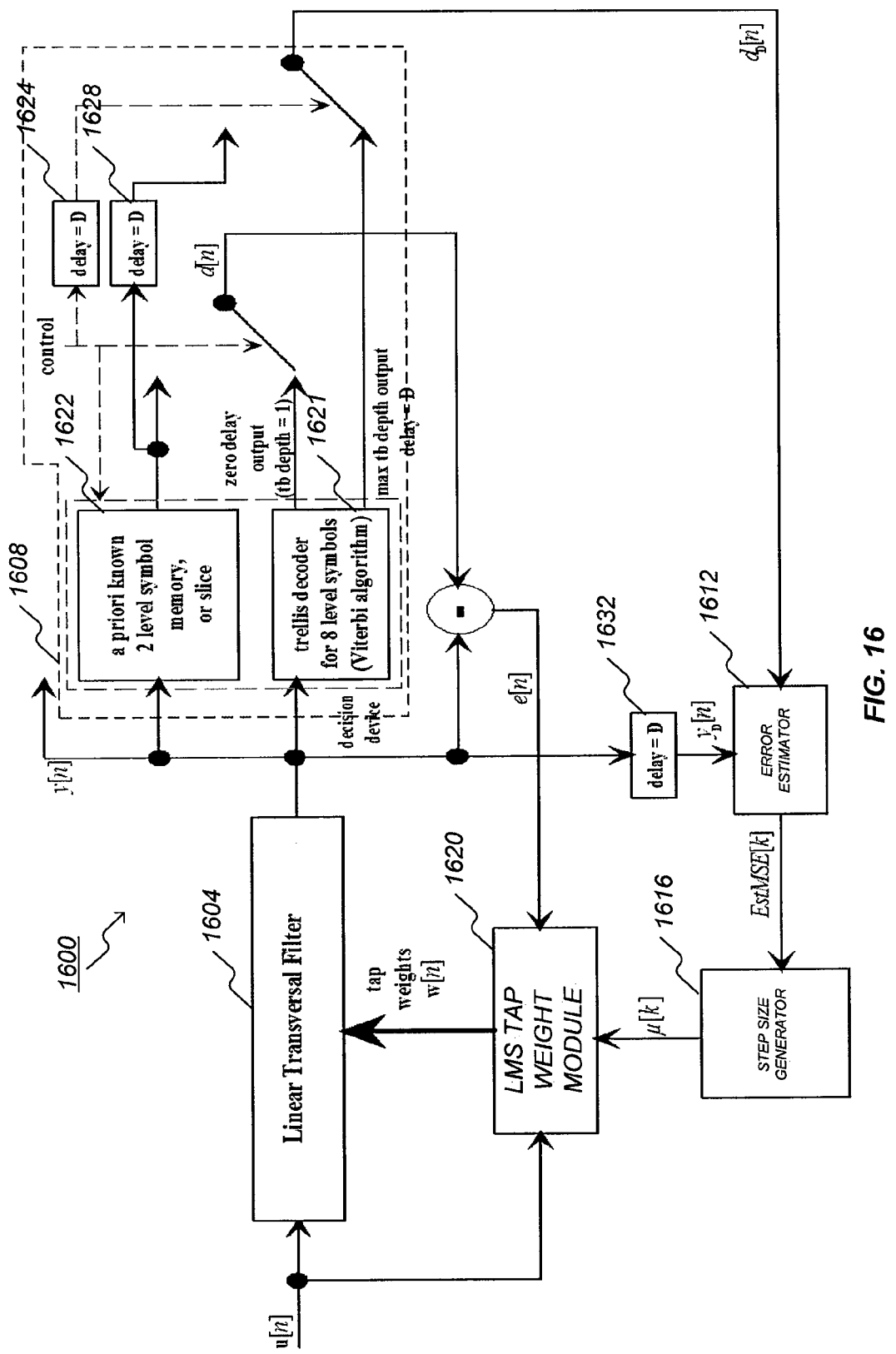
FIG. 16 shows a linear equalizer system according to an embodiment of the invention.

FIG. 16 shows a second LE system 1600 according to an embodiment of the invention. The LE system 1600 is an alternative embodiment of the LE system 900 of FIG. 9C. Similar to the LE system 900, the LE system 1600 includes a linear transversal filter 1604 having tap weights w and an output y[n], a selection module 1608, an error estimator 1612, a step size generator 1616 that generates a step size parameter $\mu[k]$, and an LMS tap weight module 1620 that adjusts the tap weights w based on the step size parameter $\mu[k]$. Furthermore, the selection module 1608 includes a decoder 1621 that decodes the coded symbols at the equalizer output y[n] using the Viterbi algorithm, and a slicer 1622 that slices the unknown 2-level symbols at a midpoint.

The LE system 1600 also includes a plurality of delay blocks 1624, 1628, 1632 that introduce delays during signal processing. In some embodiments, the error estimator 1612 includes an MSE estimator. In such cases, the step size generator 1616 generates the step size parameter μ[k] based on errors estimated by the MSE estimator. However, unlike the LE system 900 of FIG. 9C, the LE system 1600 uses a trellis decoder 1621 with a full traceback depth D+1 (which thus has a decode delay D) and delay blocks 1624, 1628, 1632, all with delay D. A full traceback depth of the trellis decoder 1621 can generate an output that has a higher reliability than a zero delay output generated by the trellis decoder 928 of FIG. 9C. As such, the trellis decoder 1621 with adjustable traceback depth controlled by the delay blocks 1624, 1628, 1632 can provide a more accurate $\xi_{dec,\beta}^2$ value if both the a priori known 2-level symbol output memory and the y[n] signal are likewise delayed by D. Accordingly, the input to the error estimator 1612 is $d_D[n]$, which is $d_D[n]$ delayed by an amount D.

In the LE system 1600, for the coded symbols, an instantaneous MSE estimate at block time k given by EQN. (26).

$$\xi_{dec}^2[k] = \left(\frac{1}{M}\right)\sum_{i=0}^{M-1}(y_D[m+i] - d_D[m+i])^2 \quad (26)$$

where k is a block index, the symbol index base m=(k−1)M, $y_D$ is a delayed equalizer output, d is a full traceback output of the trellis decoder 1621 with a delay D, and M is a selected block size. Similarly, in the LE system 1600, for the uncoded symbols, an instantaneous MSE estimate at segment j is given by EQN. (27).

$$\xi_{seg}^2[j] = \left(\frac{1}{4}\right)\sum_{i=0}^{3}(y_D[p+i] - d_D[p+i])^2 \quad (27)$$

where j is a segment index, and p=832(j−1) is a symbol index. Blocks k and segments j are in general asynchronous.

Various convergence criteria may be used in connection with embodiments of the invention. In some embodiments, an initial error (e.g., MSE) estimate based on coded symbols is used to determine if coded symbols should continue to be used for further error estimates, or if uncoded symbols should be used for further error estimates. Other exemplary embodiments use convergence criteria based on how often the sign of an error gradient changes.

Consider a case where the equalizer 970 of FIG. 9A has already converged and its output MSE is low, such that a small LMS step size (μ) has been selected according to the previously described methods. When the equalizer 970 has converged, its tap weights w can be said to be adjusted properly for the current multipath channel conditions, and the tap weights w can be seen to change very little as time progresses, as long as the channel conditions are static. If the channel conditions begin to change with time, the channel is then considered to be dynamic.

If the post convergence channel conditions change rapidly enough, the MSE at the equalizer output will increase because the above-described LMS algorithm, operating with a small step size (μ), cannot track the changing channel conditions fast enough. This may result in a selection of a larger LMS step size (μ) after the MSE has increased beyond a specific point, which may then aid the LMS algorithm in its attempt to track the changing channel conditions. However, this change in channel conditions may be so rapid that a switch to a larger step size is too late, resulting in an ultimate divergence of the equalizer 970 as it is unable to track a dynamic channel.

In some embodiments of the invention, a larger step size is selected earlier in the channel tracking process, while the MSE is still relatively small, using a metric other than the MSE estimate EstMSE. Under dynamic channel conditions, even though the MSE remains low and thus the step size (μ) small, the equalizer tap weights w vary much more than under static channel conditions. Therefore, a measure of the difference of the tap weight vector values w at two points in time, if in excess of one or more predetermined thresholds, can be used to trigger an increase in LMS step size (μ) earlier in the process, while the MSE estimate EstMSE is still small.

Figure 17:
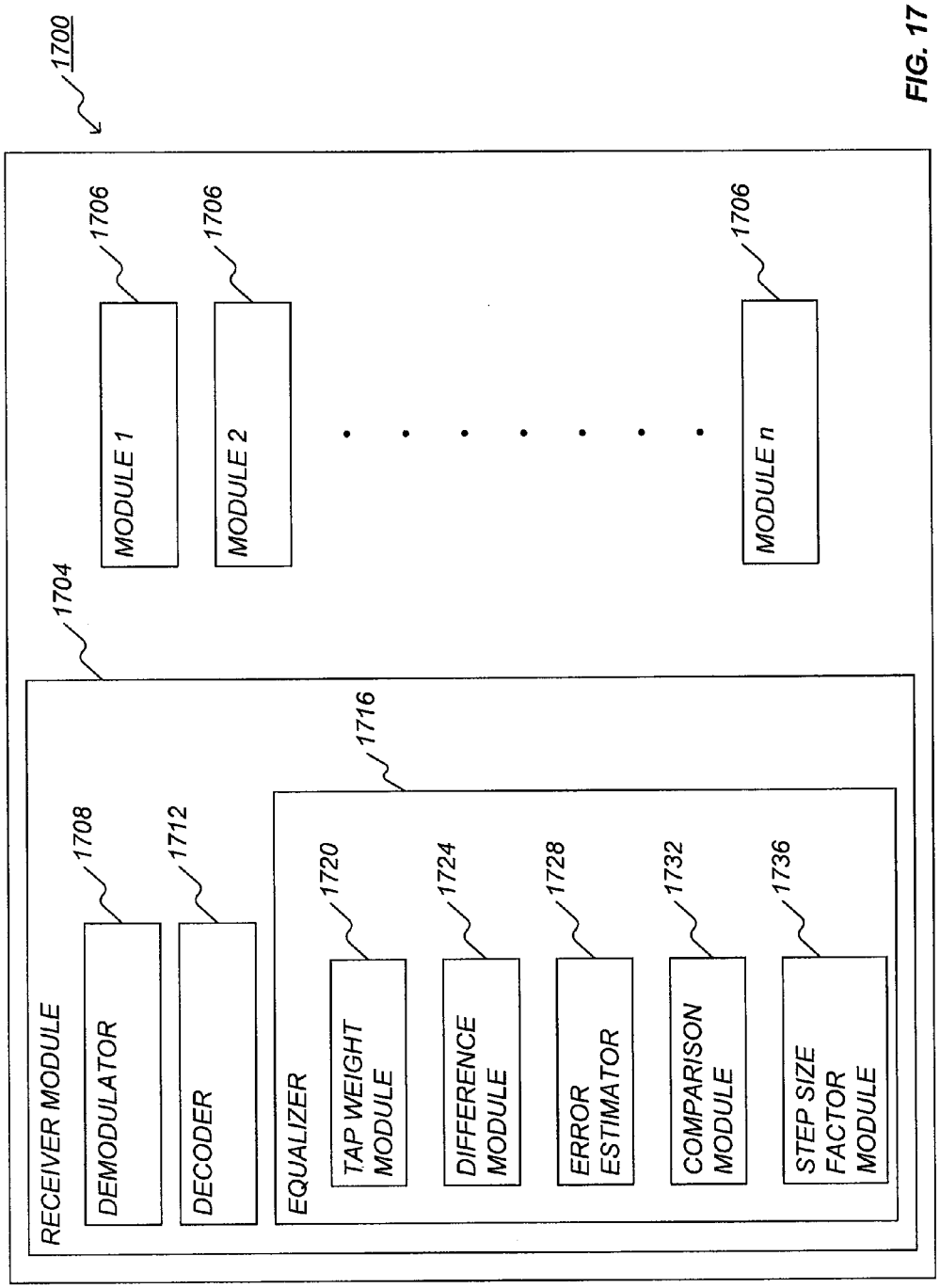
FIG. 17 shows a digital communications device according to an embodiment of the invention.

FIG. 17 shows a digital communications device 1700 according to an embodiment of the invention. The device 1700 can be implemented as, or in conjunction with, any of a host of devices, such as, for example, a receiver (e.g., digital communication receiver), tuner, PC adapter card, set top box, DVD recorder, HDTV recorder, television, phone, or handheld device. The device 1700 can be implemented partially or entirely on a semiconductor (e.g., FPGA semiconductor) chip, such as a chip developed through a register transfer level (RTL) design process. The device 1700 includes a receiver module 1704 and optional hardware and/or software module(s) 1706 that provide additional functions (e.g., display functions). In other embodiments, the device 1700 includes more or fewer modules than those depicted. For example, certain of the depicted modules can be implemented on other devices that interface with the device 1700 (e.g., the receiver module 1704 can communicate with a display module incorporated in a separate device).

The receiver module 1704 includes a demodulator 1708, a decoder 1712, and an equalizer 1716. In some embodiments, the receiver module 1704 includes one or more additional modules, such as, for example, a tuner, a sync and timing recovery module, a matched filter, a phase tracker, a deinterleaver, a second decoder, a slicer, a derandomizer, a Fourier transformer, and/or an inverse Fourier transformer. The equalizer 1716 includes a tap weight module 1720, a difference module 1724, an error estimator 1728, a comparison module 1732, and a step size factor module 1736. In some embodiments, the tap weight module 1720 stores, in a memory, tap weights corresponding to multiple instants in time. For example, the tap weight module 1720 stores a first set of tap weights at time indices k+L, and a second set of tap weights at time index k. In some embodiments, the tap weight module 1720 constantly updates the stored tap weights.

Figure 18:
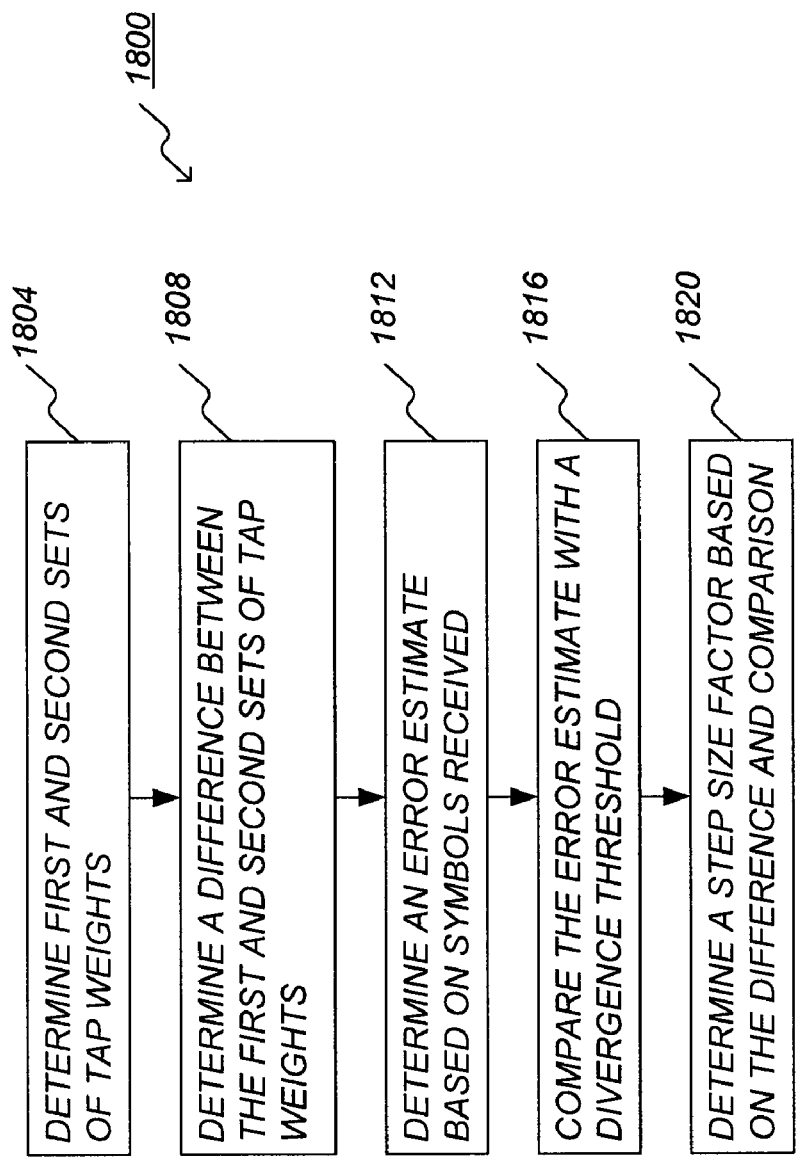
FIG. 18 shows a method according to an embodiment of the invention.

FIG. 18 shows a channel tracking method 1800 according to an embodiment of the invention. The method 1800 can be employed by, or in conjunction with, an equalizer for a digital data receiver. For instance, the method 1800 can be employed by the receiver module 1704 and/or equalizer 1716 of FIG. 17, as well as in connection with other embodiments described herein. In task 1804, a first set of equalizer tap weights (w[k]) at a first point in time, and a second set of equalizer tap weights (w[k+L]) at a second point in time, are determined (e.g., retrieved from the tap weight module 1720 or an associated memory). In task 1808, a difference between the first and second sets of tap weights is determined. In some embodiments, the difference is a metric (p[k]) determined by calculating a 2-norm of the difference of the tap weight vectors w at the respective points in time, given by EQN. (28) as follows.

$$\rho[k]=\|w[k]-w[k-L]\|_2^2 \tag{28}$$

The metric determined by EQN. (28) is a time domain metric. In some embodiments, values of L are determined (e.g., selected) in advance. In general, the values of L are small enough so that the amount of tap weight variation (as represented by $\rho[k]$) can be determined quickly and updated frequently, but also large enough so that the amount of tap weight variation is not too small to be useful. For example, with k representing a block of symbols index, and with such block being 512 symbols in length, a value of L=50 or L=100 may be employed.

At task 1812, an error estimate EstMSE[k] is determined based on the decoded or the uncoded symbols (e.g., as described above). In some embodiments, an initial LMS step size is selected based on the error estimate, as shown in expression (25) described above. At task 1816, the error estimate determined at task 1812 is compared to a divergence threshold, γ. In some embodiments, the divergence threshold is generally a predetermined constant below which the equalizer is able to track a dynamic channel (e.g., a predetermined constant below which the equalizer is said to have converged to a relatively low MSE). At task 1820, a step size factor is determined based on the difference of task 1808 and the comparison of task 1816. In time domain processing, the step size factor can be, for example, a step size increment ($\Delta\mu_r$). If the error estimate EstMSE[k] is less than the divergence threshold, γ, the LMS step size (μ) is adjusted with the step size increment determined by expression (29) as follows.

If EstMSE[k]<γ and if $\rho[k] \in \Im_r$, $$\mu[k]=\mu[k]+\Delta\mu_r \tag{29}$$

where $\Im_r$ represents a plurality of difference ranges. In general, larger values of $\rho[k]$ correspond to larger values of the step size increment, $\Delta\mu_r$. For example, five regions may be established for $\rho[k]$, as shown in exemplary expression (30) as follows.

$$\begin{aligned}
\Im_1 &= (0, 20] & \Delta\mu_1 &= 0 \\
\Im_2 &= (20, 40] & \Delta\mu_2 &= 5.6 \times 10^{-3} \\
\Im_3 &= (40, 60] & \Delta\mu_3 &= 1.1 \times 10^{-2} \\
\Im_4 &= (60, 80] & \Delta\mu_4 &= 1.7 \times 10^{-2} \\
\Im_5 &= (80, \infty) & \Delta\mu_5 &= 2.3 \times 10^{-2}
\end{aligned} \tag{30}$$

That is, a different step size increment, $\Delta\mu_r$, is selected based on which of the difference ranges includes the determined difference. For example, for a difference of 55, which falls in the third difference range $\Im_3$, a step size increment, $\Delta\mu_3$, of $1.1 \times 10^{-2}$ is selected. In other embodiments, the difference ranges may vary considerably depending on the particular equalizer implementation and the selected value for L. Alternatively, Δμ can be set to a value that is directly proportional to $\rho[k]$ on a more continuous basis.

Variations of the method 1800 are within the scope of embodiments of the invention. For instance, in one embodiment, a method processes the received symbols (decoded and/or uncoded) in the frequency domain.

More specifically, each of the linear transversal filters 904 (of FIG. 9) and 1604 (of FIG. 16) has a particular filter length. In some applications, the length of such a filter can reach hundreds or thousands of taps. In such cases, more efficient hardware implementations are possible by utilizing a filter that operates in a block manner in the frequency domain. With the Fast Fourier Transform ("FFT") and its inverse ("IFFT"), the large computational overhead required for time domain convolution of the input data with the equalizer filter taps can be greatly reduced by implementing a frequency domain point wise vector multiply along with an overlap and save methodology. Additionally, the LMS iteration process as described above can be performed only once per block of symbols, instead of once per symbol. The block size is generally defined as the length of the FFT (N) minus an overlap.

Figure 19:
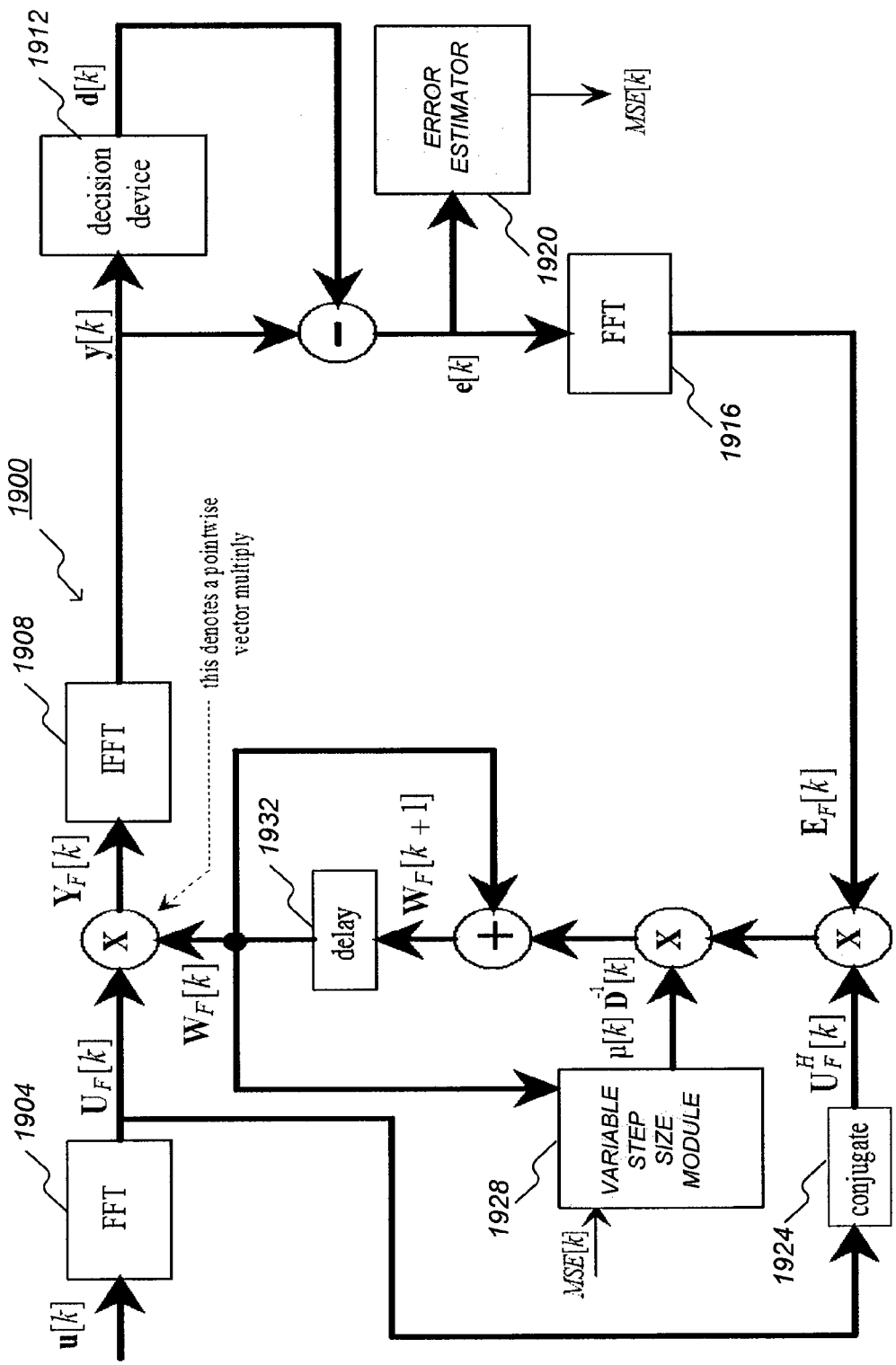
FIG. 19 shows a linear equalizer according to an embodiment of the invention.

FIG. 19 shows an unconstrained frequency domain equalizer 1900 according to an embodiment of the invention. The frequency domain equalizer 1900 includes a FFT module 1904 that transforms an equalizer input vector, u[k], into its frequency domain equivalent, $U_F[k]$, as defined in EQN. (31).

$$U_F[k]=\text{FFT}(u[k]) \tag{31}$$

where k is the block index, and the subscript F indicates a frequency domain vector. The frequency domain equalizer 1900 also includes an IFFT module 1908 that inverse transforms the equalizer frequency domain output vector, $Y_F[k]$, into its time domain equivalent, y[k], as defined in EQN. (32).

$$y[k]=\text{IFFT}(U_F[k]\hat{x}W_F[k]) \tag{32}$$

where $\hat{x}$ represents point wise vector multiply, and $W_F[k]$ is the frequency domain tap weight vector at time index k. The output vector, y[k], is then fed to a decision device 1912, such as the decision devices 908, 1608 described above. The decision device 1912 then generates a desired symbol vector, d[k].

In addition, $$\tilde{y}[k] = \begin{bmatrix} 0 \\ y[k] \end{bmatrix} \text{ and } \tilde{d}[k] = \begin{bmatrix} 0 \\ d[k] \end{bmatrix}$$

are the zero padded filter output and zero padded desired symbol vectors, respectively, with such zero padding as needed to properly execute an overlap and save methodology. An error vector (e[k]) is then obtained by subtracting the output vector from the desired symbol vector, $e[k]=\tilde{d}[k]-\tilde{y}[k]$. Similarly, a frequency domain error vector can then be defined as the FFT of a vector difference between the zero-padded desired symbol vectors and the zero-padded filter output vectors at an FFT module 1916, as shown in EQN. (33).

$$E_F[k]=\text{FFT}(\tilde{d}[k]-\tilde{y}[k])=\text{FFT}(e[k]) \tag{33}$$

Similar to the error estimators 912, 1612 described above, an error estimator 1920 estimates an error from the error vector (e[k]).

After the frequency domain input vector, $U_F[k]$, has been Hermitian conjugated at a conjugate module 1924 to obtain $U_F^H[k]$, it is point-wise vector multiplied by the frequency domain error vector, $E_F[k]$. A variable step size module 1928 then determines a variable step size scalar μ[k] from the error estimate EstMSE[k] as described. The equalizer 1900 then iteratively determines a new set of tap weights based on the current set of tap weights, the scalar μ[k], and a delay 1932 in a frequency block LMS ("FBLMS") iteration process, which is executed once per block. A FBLMS iteration process under a normal multipath condition is given by EQN. (34).

$$W_F[k+1]=W_F[k]+\mu[k](U_F^H[k] \otimes E_F[k]) \quad (34)$$

Under difficult multipath conditions, the convergence properties of the equalizer 1900 can be improved if the variable step size module 1928 utilizes step size power normalization. An exemplary step size power normalization process is represented by EQN. (35) as follows.

$$W_F[k+1]=W_F[k]+\mu[k]D^{-1}(U_F^H[k] \otimes E_F[k]) \quad (35)$$

where D is a step size normalization matrix, as shown in EQN. (36).

$$D=\text{diag}[\hat{\lambda}_0 \ldots \hat{\lambda}_{N-1}] \quad (36)$$

where $\hat{\lambda}_i$ provides a normalization factor for each equalizer tap i, where i=0 ... (N−1). $\hat{\lambda}_i$ is defined in EQN. (37) as follows.

$$\hat{\lambda}_i[k]=\beta_{step}\hat{\lambda}_i[k-1]+(1-\beta_{step})|U_{F,i}[k]|^2 \quad (37)$$

where $\beta_{step}$ is a predetermined forgetting factor.

The normalization factors $\hat{\lambda}_i$'s are a function of the frequency domain samples of the received data stream, $u_{F,i}$; hence, the $\hat{\lambda}_i$'s are a function of the channel conditions. The forgetting factor, $\beta_{step}$, controls the updating and averaging of the calculated normalizing factors. A larger $\beta_{step}$ gives more weight to past values of $\hat{\lambda}_i$, enhancing the effect of averaging over time and providing a more accurate estimate of the ideal power normalization factor. A smaller $\beta_{step}$ gives less weight to past values of $\hat{\lambda}_i$, resulting in a noisier estimate of the power normalization factor.

In some embodiments, larger values of $\beta_{step}$ are employed for static channels. However, in other embodiments, for dynamic channels, an optimal value for $\hat{\lambda}_i$ changes over time as the channel condition changes. Hence, in some embodiments, a smaller value of $\beta_{step}$ is employed to more quickly "forget" past values.

In the frequency domain, the channel tracking method 1800 of FIG. 18 can be employed to determine a step size factor that is, for example, the forgetting factor $\beta_{step}$. The difference of task 1808 can be determined, for example, by calculating a 2-norm of the difference of the frequency domain or transformed tap weight vectors at different points in time k and k−L, as shown in EQN. (38) as follows.

$$\rho[k]=\|W_F[k]-W_F[k-L]\|_2^2 \quad (38)$$

In an embodiment, either a large or small $\beta_{step}$ is selected depending on an estimate of changing channel conditions as shown in expressions (39) and (40).

If EstMSE[k]<γ if p[k]>α, $$\beta_{step}[k]=\xi_{small} \quad (39)$$

else $$\beta_{step}[k]=\xi_{large} \quad (40)$$

where α is a difference threshold, $\xi_{small}$ and $\xi_{large}$ are predetermined constants, and $\xi_{small}<\xi_{large}$. That is, if the error estimate is less than the divergence threshold, and if the difference is greater than the difference threshold, the forgetting factor is assigned a relatively small value. Conversely, if the error estimate is less than the divergence threshold, and if the difference is less than the difference threshold, the forgetting factor is assigned a relatively large value. Alternatively, $\beta_{step}[k]$ can be set to be inversely proportional to $\rho[k]$ in a continuous manner as shown in expression (41).

$$\text{if } EstMSE[k]<\gamma, \beta_{step}[k]=\frac{\kappa}{\rho[k]} \quad (41)$$

where κ is a predetermined constant. That is, if the error estimate is greater than a divergence threshold, the forgetting factor increases as the difference decreases.

Once the variable step size module 1928 determines the forgetting factor, $\beta_{step}[k]$, the variable step size module 1928 proceeds to determine the normalization factor $\hat{\lambda}_i$ for each equalizer tap, and to generate the step size normalization matrix, D, as described. The equalizer 1900 then iteratively generates a new set of frequency domain tap weights, $W_F[k+1]$, based on EQN. (35). A delay is then applied to the new set of frequency domain tap weights at the delay module 1932. The delayed set of frequency domain tap weights are then used in filtering an input vector. The equalizer 1900 then iteratively applies the FBLMS process as described.

It should be noted that the numerical values described above and illustrated in the drawings are exemplary values only. Other numerical values can also be used. Additionally, various embodiments above may be selectively and separately implemented in suitable contexts, or together (e.g., in the same equalizer).

Various features and advantages of the invention are set forth in the following claims.

What is claimed is:

1. A method of channel tracking in an adaptive equalizer for a digital data receiver, the receiver configured to receive radio frequency signals modulated with data including coded symbols and uncoded symbols, the method comprising:

demodulating, in a demodulator, the received radio frequency signals to produce the coded symbols and the uncoded symbols;

decoding, in a decoder, the coded symbols to produce corresponding decoded symbols;

determining, in a tap weight module, a first set of equalizer tap weights at a first time and a second set of equalizer tap weights at a second time;

calculating, in a difference module, a difference between the first and second sets of equalizer tap weights;

determining, in an error estimator, an error estimate based on the symbols received at the receiver;

comparing, in a comparison module, the error estimate with a divergence threshold;

determining, in a step size factor module, a step size factor based on the difference between the first and second sets of equalizer tap weights and the comparison of the error estimate with the divergence threshold, wherein the step size factor is adjusted when the error estimate is less than the divergence threshold; and calculating a new step size value as a function of the step size factor and a current step size value.

2. The method of claim 1, wherein the first and second sets of equalizer tap weights comprise respective frequency domain tap weights, and the step size factor comprises a forgetting factor.

3. The method of claim 2, wherein determining a step size factor comprises:

assigning a first predetermined forgetting factor when the difference between the first and second sets of equalizer tap weights is greater than a difference threshold; and assigning a second predetermined forgetting factor when the difference between the first and second sets of equalizer tap weights is less than or equal to the difference threshold, wherein the first predetermined forgetting factor is less than the second predetermined forgetting factor.

4. The method of claim 2, wherein the forgetting factor is inverse- proportionally related to the difference between the first and second sets of equalizer tap weights.

5. The method of claim 2, wherein the difference between the first and second sets of equalizer tap weights comprises a 2-norm difference, the method further comprising:

determining a normalization factor based on the forgetting factor and the first and second sets of equalizer tap weights; and iteratively determining a third set of frequency domain tap weights based on the normalization factor.

6. The method of claim 1, wherein the step size factor comprises a step size increment, and wherein determining a step size factor comprises:

comparing the difference between the first and second sets of equalizer tap weights with a plurality of difference ranges including a first difference range, each of the difference ranges having a corresponding step size increment; and selecting the corresponding step size increment of the first difference range if the difference between the first and second sets of equalizer tap weights is within the first difference range.

7. The method of claim 6, further comprising incrementing the current step size based on the step size increment to determine the new step size.

8. The method of claim 1, further comprising:

comparing the error estimate with a plurality of error ranges including a first error range, each of the error ranges having a corresponding base step size; and selecting a corresponding base step size of the first error range if the error estimate is within the first error range.

9. The method of claim 1, wherein the difference comprises a 2-norm of the difference between the first and second sets of equalizer tap weights.

10. The method of claim 1, wherein the error estimate comprises a mean-squared-error estimate.

11. The method of claim 1, wherein the first time is different from the second time.

12. The method of claim 11, further comprising determining a third set of tap weights based on at least one of the first and second sets of equalizer tap weights, the difference between the first and second sets of equalizer tap weights, and the comparison of the error estimate with the divergence threshold, wherein the third set of tap weights comprise tap weights of the equalizer at a third time, wherein the third time is different from the first and second times.

13. The method of claim 1, wherein calculating a new step size value includes adding the step size factor to the current step size value.

14. The method of claim 1, wherein the equalizer is a linear-mean-squared (LMS) equalizer for 8-level-vestigial-sideband (8VSB) modulated signals.

15. The method of claim 1, wherein the digital data receiver is a digital television receiver.

16. An adaptive equalizer for a digital data receiver, data received by the receiver including coded symbols, the equalizer comprising:

a tap weight module configured to determine a first set of equalizer tap weights at a first time and a second set of equalizer tap weights at a second time;

a difference module configured to calculate a difference between the first and second sets of equalizer tap weights;

an error estimator configured to determine an error estimate based on symbols received at the receiver;

a comparison module configured to compare the error estimate with a divergence threshold;

a step size factor module configured to determine a step size factor based on the difference between the first and second sets of equalizer tap weights and the comparison of the error estimate with the divergence threshold, wherein the step size factor is adjusted when the error estimate is less than the divergence threshold; and a step size generator configured to generate a new step size as a function of the step size factor and a current step size.

17. The equalizer of claim 16, wherein the equalizer is implemented on a semiconductor chip.

18. The equalizer of claim 16, wherein the equalizer is implemented in a digital television receiver.

19. The equalizer of claim 16, wherein the step size factor comprises a step size increment.

20. The equalizer of claim 16, wherein the equalizer is a frequency domain block linear-mean-squared (FBLMS) equalizer for 8-level-vestigial-sideband (8VSB) modulated signals, and wherein the step size factor comprises a forgetting factor.

21. A device configured to process digital television signals, thecm device comprising:

a receiver including a demodulator, a decoder, and an equalizer, the receiver configured to receive radio frequency signals modulated with data including coded symbols and uncoded symbols, the demodulator configured to demodulate the received radio frequency signals to produce the coded symbols and the uncoded symbols, the decoder configured to decode the coded symbols to produce corresponding decoded symbols, and the equalizer including a tap weight module configured to determine a first set of equalizer tap weights at a first time and a second set of equalizer tap weights at a second time, a difference module configured to determine a difference between the first and second sets of equalizer tap weights, an error estimator configured to determine an error estimate based on symbols received at the receiver, a comparison module configured to compare the error estimate with a divergence threshold, a step size factor module configured to determine a step size factor based on the difference between the first and second sets of equalizer tap weights and the comparison of the error estimate with the divergence threshold, wherein the step size factor is adjusted when the error estimate is less than the divergence threshold, and a step size generator configured to generate a new step size as a function of the step size factor and a current step size.

22. The device of claim 21, wherein the device is a tuner, a television, a PC adapter card, a set top box, a DVD recorder, a HDTV recorder, a phone, or a handheld device.

23. A method of determining a step size for a linear-mean-squared (LMS) equalizer of 8-level-vestigial-sideband (8VSB) modulated signals having trellis-coded symbols and segment sync symbols, the method comprising:

(a) determining a mean-squared-error estimate based on at least one of decoded trellis-coded symbols and the segment sync symbols;
(b) determining a first set of equalizer tap weights at a first time and a second set of equalizer tap weights at a second time;
(c) determining a 2-norm of the difference between the first and second sets of equalizer tap weights;
(d) comparing the error estimate with a divergence threshold;
(e) if the error estimate is less than the divergence threshold, comparing the 2-norm difference between the first and second sets of equalizer tap weights with a plurality of difference ranges including a first difference range, each of the difference ranges having a corresponding step size increment, selecting the corresponding step size increment of the first difference range if the 2-norm is within the first difference range, and incrementing a base step size based on the step size increment to determine a step size, and determining a third set of tap weights based on the step size; and
(f) iteratively performing acts (a)-(e).

24. A digital communication receiver configured to receive radio frequency signals modulated with data including coded symbols and a priori known uncoded symbols, the receiver comprising:

a demodulator configured to demodulate the received radio frequency signals to produce the coded symbols and the a priori known uncoded symbols;

a decoder configured to decode the coded symbols to produce corresponding decoded symbols; and a frequency domain equalizer including a difference module configured to determine a difference between a first equalizer tap weight vector at a first time and a second equalizer tap weight vector at a second time, an error estimator configured to determine an error estimate based on the decoded symbols or the uncoded symbols, a comparison module configured to compare the error estimate with a divergence threshold, and a forgetting factor module configured to determine a forgetting factor based on the difference between the first and second equalizer tap weight vectors and the comparison of the error estimate with the divergence threshold.

* * * * *